(12) United States Patent
Van De Groenendaal et al.

(10) Patent No.: US 10,567,855 B2
(45) Date of Patent: Feb. 18, 2020

(54) TECHNOLOGIES FOR ALLOCATING RESOURCES WITHIN A SELF-MANAGED NODE

(71) Applicant: Intel Corporation, Santa Clara, CA (US)

(72) Inventors: Johan G. Van De Groenendaal, Portland, OR (US); Mrittika Ganguli, Bangalore (IN); Ahmad Yasin, Haifa (IL); Andrew J. Herdrich, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 453 days.

(21) Appl. No.: 15/395,179

(22) Filed: Dec. 30, 2016

(65) Prior Publication Data

US 2018/0026904 A1    Jan. 25, 2018

Related U.S. Application Data

(60) Provisional application No. 62/365,969, filed on Jul. 22, 2016, provisional application No. 62/376,859, (Continued)

(51) Int. Cl.
*G06F 15/16* (2006.01)
*H04L 29/08* (2006.01)
(Continued)

(52) U.S. Cl.
CPC ...... *H04Q 11/0005* (2013.01); *B25J 15/0014* (2013.01); *B65G 1/0492* (2013.01); (Continued)

(58) Field of Classification Search
USPC .............. 709/226, 224, 229, 223, 220, 245
See application file for complete search history.

(56) References Cited

U.S. PATENT DOCUMENTS 8,949,483 B1 *  2/2015  Martin .................. G06F 3/0653
                                                                710/15
9,626,116 B1 *  4/2017  Martin .................. G06F 3/0689
                          (Continued)

OTHER PUBLICATIONS

International search report for PCT application No. PCT/US2017/038751, dated Sep. 27, 2017 (3 pages).
(Continued)

*Primary Examiner* — Jude Jean Gilles
(74) *Attorney, Agent, or Firm* — Barnes & Thornburg LLP

(57) ABSTRACT

Technologies for dynamically allocating resources within a self-managed node include a self-managed node to receive quality of service objective data indicative of a performance objective of one or more workloads assigned to the self-managed node. Each workload includes one or more tasks. The self-managed node is also to execute the one or more tasks to perform the one or more workloads, obtain telemetry data as the workloads are performed, determine, as a function of the telemetry data, an adjustment to the allocation of resources among the workloads to satisfy the performance objective, and apply the determined adjustment as the workloads are performed by the self-managed node. Other embodiments are also described and claimed.

30 Claims, 17 Drawing Sheets

Related U.S. Application Data filed on Aug. 18, 2016, provisional application No. 62/427,268, filed on Nov. 29, 2016.

(51) Int. Cl.

| | |
|---|---|
| *H04Q 11/00* | (2006.01) |
| *H03M 7/30* | (2006.01) |
| *H03M 7/40* | (2006.01) |
| *G06F 16/901* | (2019.01) |
| *G06F 3/06* | (2006.01) |
| *H04L 12/811* | (2013.01) |
| *G11C 7/10* | (2006.01) |
| *H05K 7/14* | (2006.01) |
| *G06F 1/18* | (2006.01) |
| *G06F 13/40* | (2006.01) |
| *H05K 5/02* | (2006.01) |
| *G08C 17/02* | (2006.01) |
| *H04L 12/24* | (2006.01) |
| *H04L 12/26* | (2006.01) |
| *H04L 12/851* | (2013.01) |
| *G06F 9/50* | (2006.01) |
| *H04L 12/911* | (2013.01) |
| *G06F 12/109* | (2016.01) |
| *H04L 29/06* | (2006.01) |
| *G11C 14/00* | (2006.01) |
| *G11C 5/02* | (2006.01) |
| *G11C 11/56* | (2006.01) |
| *G02B 6/44* | (2006.01) |
| *G06F 8/65* | (2018.01) |
| *G06F 12/14* | (2006.01) |
| *G06F 13/16* | (2006.01) |
| *H04B 10/25* | (2013.01) |
| *G06F 9/4401* | (2018.01) |
| *G02B 6/38* | (2006.01) |
| *G02B 6/42* | (2006.01) |
| *B25J 15/00* | (2006.01) |
| *B65G 1/04* | (2006.01) |
| *H05K 7/20* | (2006.01) |
| *H04L 12/931* | (2013.01) |
| *H04L 12/939* | (2013.01) |
| *H04W 4/02* | (2018.01) |
| *H04L 12/751* | (2013.01) |
| *G06F 13/42* | (2006.01) |
| *H05K 1/18* | (2006.01) |
| *G05D 23/19* | (2006.01) |
| *G05D 23/20* | (2006.01) |
| *H04L 12/927* | (2013.01) |
| *H05K 1/02* | (2006.01) |
| *H04L 12/781* | (2013.01) |
| *H04Q 1/04* | (2006.01) |
| *G06F 12/0893* | (2016.01) |
| *H05K 13/04* | (2006.01) |
| *G11C 5/06* | (2006.01) |
| *G06F 11/14* | (2006.01) |
| *G06F 11/34* | (2006.01) |
| *G06F 12/0862* | (2016.01) |
| *G06F 15/80* | (2006.01) |
| *H04L 12/919* | (2013.01) |
| *G06F 12/10* | (2016.01) |
| *G06Q 10/06* | (2012.01) |
| *G07C 5/00* | (2006.01) |
| *H04L 12/28* | (2006.01) |
| *H04L 29/12* | (2006.01) |
| *H04L 9/06* | (2006.01) |
| *H04L 9/14* | (2006.01) |
| *H04L 9/32* | (2006.01) |
| *H04L 12/933* | (2013.01) |
| *H04L 12/947* | (2013.01) |
| *G06F 9/30* | (2018.01) |
| *G06F 9/38* | (2018.01) |
| *G06F 9/54* | (2006.01) |
| *H04W 4/80* | (2018.01) |
| *G06Q 10/08* | (2012.01) |
| *G06Q 10/00* | (2012.01) |
| *G06Q 50/04* | (2012.01) |

(52) U.S. Cl.
CPC ......... *G02B 6/3882* (2013.01); *G02B 6/3893* (2013.01); *G02B 6/3897* (2013.01); *G02B 6/4292* (2013.01); *G02B 6/4452* (2013.01); *G05D 23/1921* (2013.01); *G05D 23/2039* (2013.01); *G06F 1/183* (2013.01); *G06F 3/061* (2013.01); *G06F 3/064* (2013.01); *G06F 3/067* (2013.01); *G06F 3/0611* (2013.01); *G06F 3/0613* (2013.01); *G06F 3/0616* (2013.01); *G06F 3/0619* (2013.01); *G06F 3/0625* (2013.01); *G06F 3/0631* (2013.01); *G06F 3/0638* (2013.01); *G06F 3/0647* (2013.01); *G06F 3/0653* (2013.01); *G06F 3/0655* (2013.01); *G06F 3/0658* (2013.01); *G06F 3/0659* (2013.01); *G06F 3/0664* (2013.01); *G06F 3/0665* (2013.01); *G06F 3/0673* (2013.01); *G06F 3/0679* (2013.01); *G06F 3/0683* (2013.01); *G06F 3/0688* (2013.01); *G06F 3/0689* (2013.01); *G06F 8/65* (2013.01); *G06F 9/30036* (2013.01); *G06F 9/3887* (2013.01); *G06F 9/4401* (2013.01); *G06F 9/505* (2013.01); *G06F 9/5016* (2013.01); *G06F 9/5044* (2013.01); *G06F 9/5072* (2013.01); *G06F 9/5077* (2013.01); *G06F 9/544* (2013.01); *G06F 11/141* (2013.01); *G06F 11/3414* (2013.01); *G06F 12/0862* (2013.01); *G06F 12/0893* (2013.01); *G06F 12/10* (2013.01); *G06F 12/109* (2013.01); *G06F 12/1408* (2013.01); *G06F 13/161* (2013.01); *G06F 13/1668* (2013.01); *G06F 13/1694* (2013.01); *G06F 13/409* (2013.01); *G06F 13/4022* (2013.01); *G06F 13/4068* (2013.01); *G06F 13/42* (2013.01); *G06F 13/4282* (2013.01); *G06F 15/8061* (2013.01); *G06F 16/9014* (2019.01); *G06Q 10/06* (2013.01); *G06Q 10/06314* (2013.01); *G07C 5/008* (2013.01); *G08C 17/02* (2013.01); *G11C 5/02* (2013.01); *G11C 5/06* (2013.01); *G11C 7/1072* (2013.01); *G11C 11/56* (2013.01); *G11C 14/0009* (2013.01); *H03M 7/30* (2013.01); *H03M 7/3084* (2013.01); *H03M 7/3086* (2013.01); *H03M 7/40* (2013.01); *H03M 7/4031* (2013.01); *H03M 7/4056* (2013.01); *H03M 7/4081* (2013.01); *H03M 7/6005* (2013.01); *H03M 7/6023* (2013.01); *H04B 10/2504* (2013.01); *H04L 9/0643* (2013.01); *H04L 9/14* (2013.01); *H04L 9/3247* (2013.01); *H04L 9/3263* (2013.01); *H04L 12/2809* (2013.01); *H04L 29/12009* (2013.01); *H04L 41/024* (2013.01); *H04L 41/046* (2013.01); *H04L 41/082* (2013.01); *H04L 41/0813* (2013.01); *H04L 41/0896* (2013.01); *H04L 41/145* (2013.01); *H04L 41/147* (2013.01); *H04L 43/08* (2013.01); *H04L 43/0817* (2013.01);

H04L 43/0876 (2013.01); H04L 43/0894 (2013.01); H04L 43/16 (2013.01); H04L 45/02 (2013.01); H04L 45/52 (2013.01); H04L 47/24 (2013.01); H04L 47/38 (2013.01); H04L 47/765 (2013.01); H04L 47/782 (2013.01); H04L 47/805 (2013.01); H04L 47/82 (2013.01); H04L 47/823 (2013.01); H04L 49/00 (2013.01); H04L 49/15 (2013.01); H04L 49/25 (2013.01); H04L 49/357 (2013.01); H04L 49/45 (2013.01); H04L 49/555 (2013.01); H04L 67/02 (2013.01); H04L 67/10 (2013.01); H04L 67/1004 (2013.01); H04L 67/1008 (2013.01); H04L 67/1012 (2013.01); H04L 67/1014 (2013.01); H04L 67/1029 (2013.01); H04L 67/1034 (2013.01); H04L 67/1097 (2013.01); H04L 67/12 (2013.01); H04L 67/16 (2013.01); H04L 67/306 (2013.01); H04L 67/34 (2013.01); H04L 69/04 (2013.01); H04L 69/329 (2013.01); H04Q 1/04 (2013.01); H04Q 11/00 (2013.01); H04Q 11/0003 (2013.01); H04Q 11/0062 (2013.01); H04Q 11/0071 (2013.01); H04W 4/023 (2013.01); H05K 1/0203 (2013.01); H05K 1/181 (2013.01); H05K 5/0204 (2013.01); H05K 7/1418 (2013.01); H05K 7/1421 (2013.01); H05K 7/1422 (2013.01); H05K 7/1442 (2013.01); H05K 7/1447 (2013.01); H05K 7/1461 (2013.01); H05K 7/1487 (2013.01); H05K 7/1489 (2013.01); H05K 7/1491 (2013.01); H05K 7/1492 (2013.01); H05K 7/1498 (2013.01); H05K 7/2039 (2013.01); H05K 7/20709 (2013.01); H05K 7/20727 (2013.01); H05K 7/20736 (2013.01); H05K 7/20745 (2013.01); H05K 7/20836 (2013.01); H05K 13/0486 (2013.01); G06F 2209/5019 (2013.01); G06F 2209/5022 (2013.01); G06F 2212/1008 (2013.01); G06F 2212/1024 (2013.01); G06F 2212/1041 (2013.01); G06F 2212/1044 (2013.01); G06F 2212/152 (2013.01); G06F 2212/202 (2013.01); G06F 2212/401 (2013.01); G06F 2212/402 (2013.01); G06F 2212/7207 (2013.01); G06Q 10/087 (2013.01); G06Q 10/20 (2013.01); G06Q 50/04 (2013.01); G08C 2200/00 (2013.01); H04B 10/25 (2013.01); H04L 41/12 (2013.01); H04L 41/5019 (2013.01); H04L 43/065 (2013.01); H04Q 2011/0037 (2013.01); H04Q 2011/0041 (2013.01); H04Q 2011/0052 (2013.01); H04Q 2011/0073 (2013.01); H04Q 2011/0079 (2013.01); H04Q 2011/0086 (2013.01); H04Q 2213/13523 (2013.01); H04Q 2213/13527 (2013.01); H04W 4/80 (2018.02); H05K 7/1485 (2013.01); H05K 2201/066 (2013.01); H05K 2201/10121 (2013.01); H05K 2201/10159 (2013.01); H05K 2201/10189 (2013.01); Y02D 10/14 (2018.01); Y02D 10/151 (2018.01); Y02P 90/30 (2015.11); Y04S 10/54 (2013.01); Y10S 901/01 (2013.01)

(56) References Cited

U.S. PATENT DOCUMENTS

| | | | | |
|---|---|---|---|---|
| 9,703,664 | B1* | 7/2017 | Alshawabkeh | G06F 11/3414 |
| 9,723,069 | B1* | 8/2017 | Fallows | H04L 67/1036 |
| 9,965,218 | B1* | 5/2018 | Martin | G06F 3/0649 |
| 10,254,970 | B1* | 4/2019 | Martin | G06F 3/0611 |
| 10,268,526 | B1* | 4/2019 | Martin | G06F 9/542 |
| 10,282,107 | B1* | 5/2019 | Martin | G06F 3/0611 |
| 2008/0022285 | A1 | 1/2008 | Cherkasova et al. | |
| 2008/0028409 | A1 | 1/2008 | Cherkasova et al. | |
| 2009/0235268 | A1 | 9/2009 | Seidman et al. | |
| 2010/0281285 | A1 | 11/2010 | Blanding | |
| 2010/0332622 | A1* | 12/2010 | Carolan | G06F 9/5072 709/220 |
| 2011/0158088 | A1* | 6/2011 | Lofstrand | G06F 9/465 370/229 |
| 2014/0189090 | A1* | 7/2014 | Mikkilineni | H04L 41/0886 709/223 |
| 2015/0229582 | A1 | 8/2015 | Zhu et al. | |
| 2016/0110192 | A1* | 4/2016 | Mikkilineni | G06F 11/14 718/100 |

OTHER PUBLICATIONS

Written opinion for PCT application No. PCT/US2017/038751, dated Sep. 27, 2017 (7 pages).

* cited by examiner

TECHNOLOGIES FOR ALLOCATING RESOURCES WITHIN A SELF-MANAGED NODE

CROSS-REFERENCE TO RELATED APPLICATIONS

The present application claims the benefit of U.S. Provisional Patent Application No. 62/365,969, filed Jul. 22, 2016, U.S. Provisional Patent Application No. 62/376,859, filed Aug. 18, 2016, and U.S. Provisional Patent Application No. 62/427,268, filed Nov. 29, 2016.

BACKGROUND

In a typical cloud-based computing environment (e.g., a data center), multiple compute nodes may execute workloads (e.g., applications, services, etc.) on behalf of customers. Each workload consumes resources, such as compute resources (e.g., processor cycles, processor cores, etc.), accelerator resources (e.g., field programmable gate arrays (FPGA), application specific integrated circuits (ASIC), graphics processing units (GPU), or other specialized hardware to accelerate processing), memory resources, and/or data storage resources, as the workloads are executed. Typically, each customer expects a certain quality of service (QoS), indicative of a maximum latency or a priority (e.g., a precedence over other workloads) for workloads executed on behalf of the customer. A human administrator may attempt to satisfy a relatively high QoS by assigning a relatively small amount of workloads to compute nodes that include extensive resources. As a result, those compute nodes may execute the workloads at the desired QoS, while only using a small percentage of their available resources. Accordingly, the unused capacity of those compute nodes is wasted when it could otherwise have been used to execute other workloads. Conversely, a human administrator may attempt to reduce the amount of idle resources in the data center by aggressively assigning workloads to compute nodes, which may result in the compute nodes becoming overloaded and failing to satisfy a desired QoS. As such, in typical cloud-based computing environments, the compute nodes are dependent upon an external administrator to enforce any QoS goals, which can add inefficiency to the operation of the computing environment.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
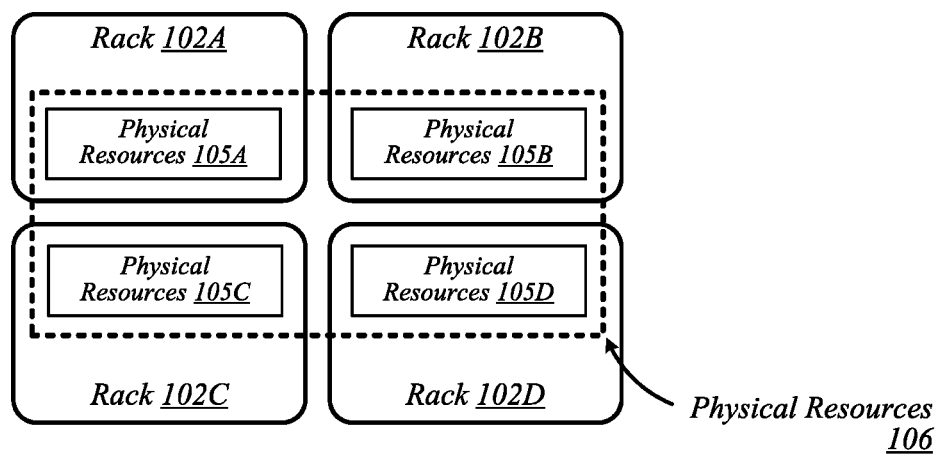
FIG. 1 is a diagram of a conceptual overview of a data center in which one or more techniques described herein may be implemented according to various embodiments.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

FIG. 1 illustrates a conceptual overview of a data center 100 that may generally be representative of a data center or other type of computing network in/for which one or more techniques described herein may be implemented according to various embodiments. As shown in FIG. 1, data center 100 may generally contain a plurality of racks, each of which may house computing equipment comprising a respective set of physical resources. In the particular non-limiting example depicted in FIG. 1, data center 100 contains four racks 102A to 102D, which house computing equipment comprising respective sets of physical resources (PCRs) 105A to 105D. According to this example, a collective set of physical resources 106 of data center 100 includes the various sets of physical resources 105A to 105D that are distributed among racks 102A to 102D. Physical resources 106 may include resources of multiple types, such as—for example—processors, co-processors, accelerators, field-programmable gate arrays (FPGAs), memory, and storage. The embodiments are not limited to these examples.

The illustrative data center 100 differs from typical data centers in many ways. For example, in the illustrative embodiment, the circuit boards ("sleds") on which components such as CPUs, memory, and other components are placed are designed for increased thermal performance In particular, in the illustrative embodiment, the sleds are shallower than typical boards. In other words, the sleds are shorter from the front to the back, where cooling fans are located. This decreases the length of the path that air must to travel across the components on the board. Further, the components on the sled are spaced further apart than in typical circuit boards, and the components are arranged to reduce or eliminate shadowing (i.e., one component in the air flow path of another component). In the illustrative embodiment, processing components such as the processors are located on a top side of a sled while near memory, such as DIMMs, are located on a bottom side of the sled. As a result of the enhanced airflow provided by this design, the components may operate at higher frequencies and power levels than in typical systems, thereby increasing performance. Furthermore, the sleds are configured to blindly mate with power and data communication cables in each rack 102A, 102B, 102C, 102D, enhancing their ability to be quickly removed, upgraded, reinstalled, and/or replaced. Similarly, individual components located on the sleds, such as processors, accelerators, memory, and data storage drives, are configured to be easily upgraded due to their increased spacing from each other. In the illustrative embodiment, the components additionally include hardware attestation features to prove their authenticity.

Furthermore, in the illustrative embodiment, the data center 100 utilizes a single network architecture ("fabric") that supports multiple other network architectures including Ethernet and Omni-Path. The sleds, in the illustrative embodiment, are coupled to switches via optical fibers, which provide higher bandwidth and lower latency than typical twisted pair cabling (e.g., Category 5, Category 5e, Category 6, etc.). Due to the high bandwidth, low latency interconnections and network architecture, the data center 100 may, in use, pool resources, such as memory, accelerators (e.g., graphics accelerators, FPGAs, ASICs, etc.), and data storage drives that are physically disaggregated, and provide them to compute resources (e.g., processors) on an as needed basis, enabling the compute resources to access the pooled resources as if they were local. The illustrative data center 100 additionally receives usage information for the various resources, predicts resource usage for different types of workloads based on past resource usage, and dynamically reallocates the resources based on this information.

The racks 102A, 102B, 102C, 102D of the data center 100 may include physical design features that facilitate the automation of a variety of types of maintenance tasks. For example, data center 100 may be implemented using racks that are designed to be robotically-accessed, and to accept and house robotically-manipulatable resource sleds. Furthermore, in the illustrative embodiment, the racks 102A, 102B, 102C, 102D include integrated power sources that receive a greater voltage than is typical for power sources. The increased voltage enables the power sources to provide additional power to the components on each sled, enabling the components to operate at higher than typical frequencies.

Figure 2:
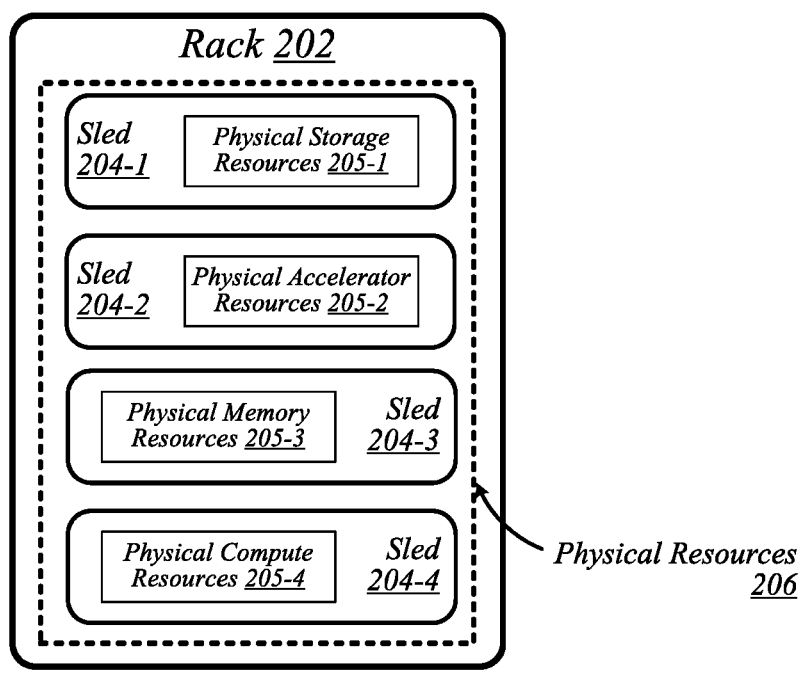
FIG. 2 is a diagram of an example embodiment of a logical configuration of a rack of the data center of FIG. 1.

FIG. 2 illustrates an exemplary logical configuration of a rack 202 of the data center 100. As shown in FIG. 2, rack 202 may generally house a plurality of sleds, each of which may comprise a respective set of physical resources. In the particular non-limiting example depicted in FIG. 2, rack 202 houses sleds 204-1 to 204-4 comprising respective sets of physical resources 205-1 to 205-4, each of which constitutes a portion of the collective set of physical resources 206 comprised in rack 202. With respect to FIG. 1, if rack 202 is representative of—for example—rack 102A, then physical resources 206 may correspond to the physical resources 105A comprised in rack 102A. In the context of this example, physical resources 105A may thus be made up of the respective sets of physical resources, including physical storage resources 205-1, physical accelerator resources 205-2, physical memory resources 205-3, and physical compute resources 205-5 comprised in the sleds 204-1 to 204-4 of rack 202. The embodiments are not limited to this example. Each sled may contain a pool of each of the various types of physical resources (e.g., compute, memory, accelerator, storage). By having robotically accessible and robotically manipulatable sleds comprising disaggregated resources, each type of resource can be upgraded independently of each other and at their own optimized refresh rate.

Figure 3:
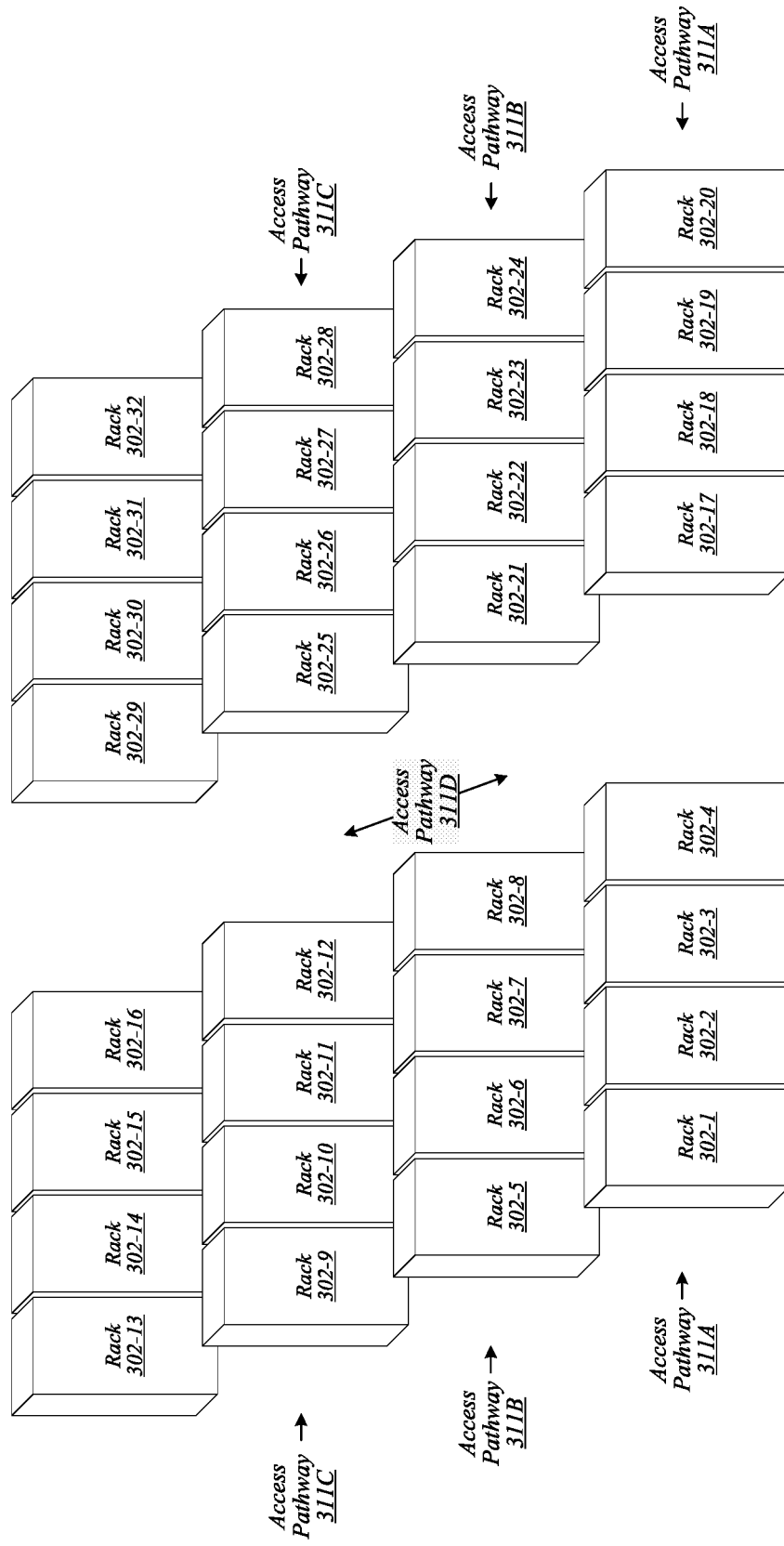
FIG. 3 is a diagram of an example embodiment of another data center in which one or more techniques described herein may be implemented according to various embodiments.

FIG. 3 illustrates an example of a data center 300 that may generally be representative of one in/for which one or more techniques described herein may be implemented according to various embodiments. In the particular non-limiting example depicted in FIG. 3, data center 300 comprises racks 302-1 to 302-32. In various embodiments, the racks of data center 300 may be arranged in such fashion as to define and/or accommodate various access pathways. For example, as shown in FIG. 3, the racks of data center 300 may be arranged in such fashion as to define and/or accommodate access pathways 311A, 311B, 311C, and 311D. In some embodiments, the presence of such access pathways may generally enable automated maintenance equipment, such as robotic maintenance equipment, to physically access the computing equipment housed in the various racks of data center 300 and perform automated maintenance tasks (e.g., replace a failed sled, upgrade a sled). In various embodiments, the dimensions of access pathways 311A, 311B, 311C, and 311D, the dimensions of racks 302-1 to 302-32, and/or one or more other aspects of the physical layout of data center 300 may be selected to facilitate such automated operations. The embodiments are not limited in this context.

Figure 4:
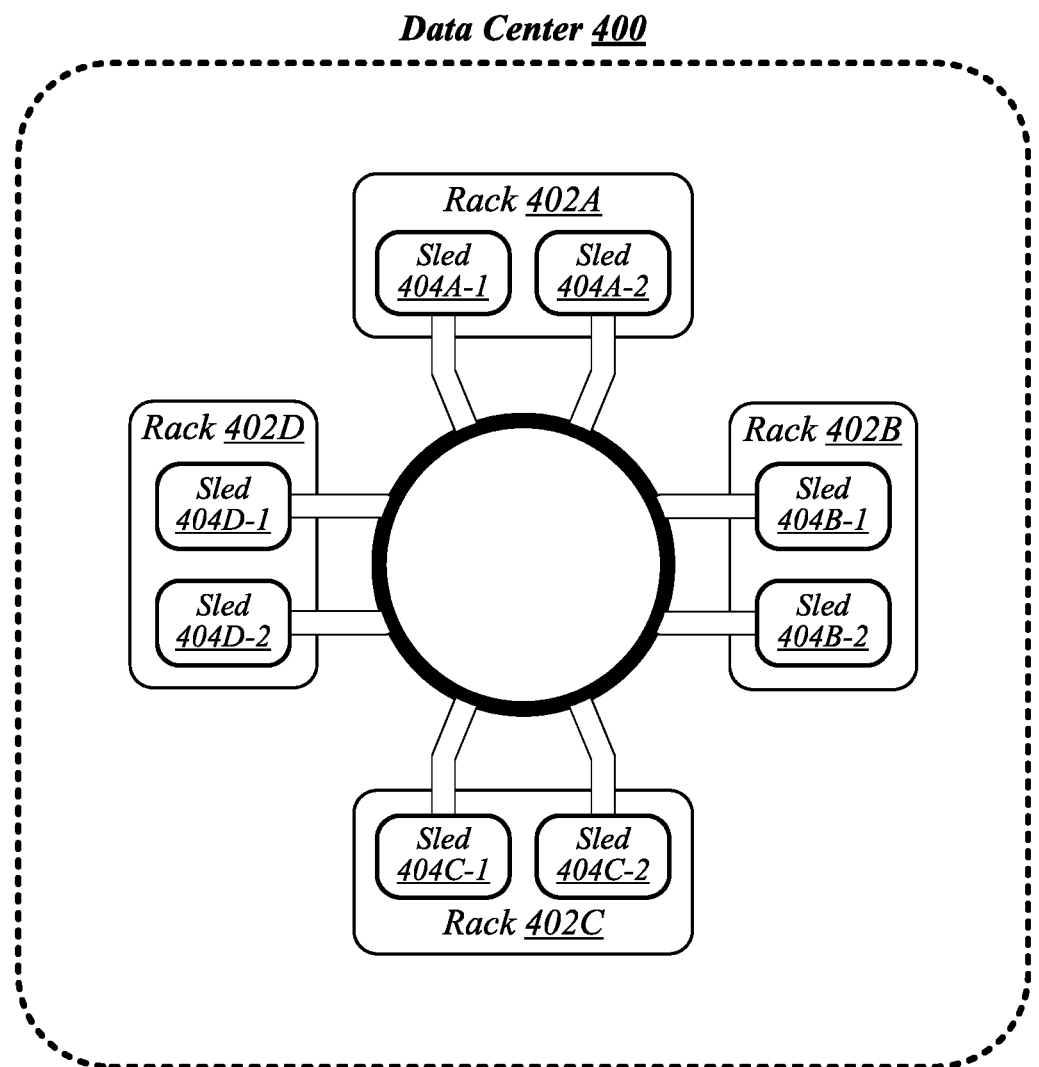
FIG. 4 is a diagram of another example embodiment of a data center in which one or more techniques described herein may be implemented according to various embodiments.

FIG. 4 illustrates an example of a data center 400 that may generally be representative of one in/for which one or more techniques described herein may be implemented according to various embodiments. As shown in FIG. 4, data center 400 may feature an optical fabric 412. Optical fabric 412 may generally comprise a combination of optical signaling media (such as optical cabling) and optical switching infrastructure via which any particular sled in data center 400 can send signals to (and receive signals from) each of the other sleds in data center 400. The signaling connectivity that optical fabric 412 provides to any given sled may include connectivity both to other sleds in a same rack and sleds in other racks. In the particular non-limiting example depicted in FIG. 4, data center 400 includes four racks 402A to 402D. Racks 402A to 402D house respective pairs of sleds 404A-1 and 404A-2, 404B-1 and 404B-2, 404C-1 and 404C-2, and 404D-1 and 404D-2. Thus, in this example, data center 400 comprises a total of eight sleds. Via optical fabric 412, each such sled may possess signaling connectivity with each of the seven other sleds in data center 400. For example, via optical fabric 412, sled 404A-1 in rack 402A may possess signaling connectivity with sled 404A-2 in rack 402A, as well as the six other sleds 404B-1, 404B-2, 404C-1, 404C-2, 404D-1, and 404D-2 that are distributed among the other racks 402B, 402C, and 402D of data center 400. The embodiments are not limited to this example.

Figure 5:
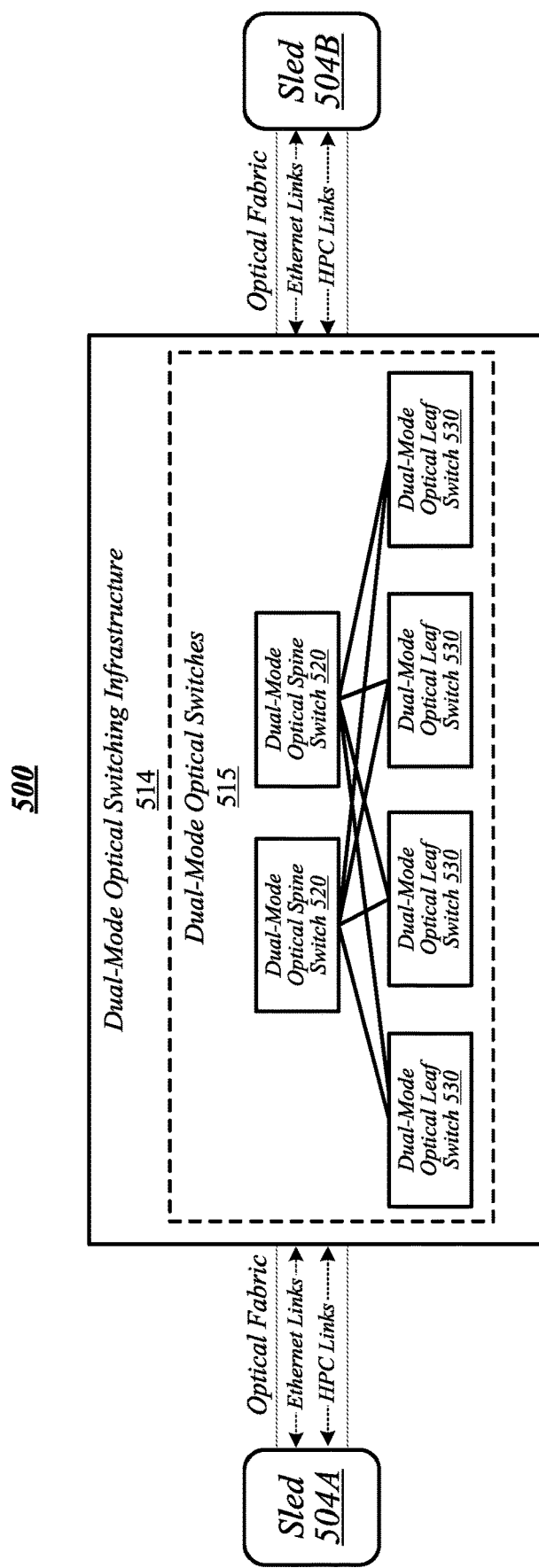
FIG. 5 is a diagram of a connectivity scheme representative of link-layer connectivity that may be established among various sleds of the data centers of FIGS. 1, 3, and 4.

FIG. 5 illustrates an overview of a connectivity scheme 500 that may generally be representative of link-layer connectivity that may be established in some embodiments among the various sleds of a data center, such as any of example data centers 100, 300, and 400 of FIGS. 1, 3, and 4. Connectivity scheme 500 may be implemented using an optical fabric that features a dual-mode optical switching infrastructure 514. Dual-mode optical switching infrastructure 514 may generally comprise a switching infrastructure that is capable of receiving communications according to multiple link-layer protocols via a same unified set of optical signaling media, and properly switching such communications. In various embodiments, dual-mode optical switching infrastructure 514 may be implemented using one or more dual-mode optical switches 515. In various embodiments, dual-mode optical switches 515 may generally comprise high-radix switches. In some embodiments, dual-mode optical switches 515 may comprise multi-ply switches, such as four-ply switches. In various embodiments, dual-mode optical switches 515 may feature integrated silicon photonics that enable them to switch communications with significantly reduced latency in comparison to conventional switching devices. In some embodiments, dual-mode optical switches 515 may constitute leaf switches 530 in a leaf-spine architecture additionally including one or more dual-mode optical spine switches 520.

In various embodiments, dual-mode optical switches may be capable of receiving both Ethernet protocol communications carrying Internet Protocol (IP packets) and communications according to a second, high-performance computing (HPC) link-layer protocol (e.g., Intel's Omni-Path Architecture's, Infiniband) via optical signaling media of an optical fabric. As reflected in FIG. 5, with respect to any particular pair of sleds 504A and 504B possessing optical signaling connectivity to the optical fabric, connectivity scheme 500 may thus provide support for link-layer connectivity via both Ethernet links and HPC links. Thus, both Ethernet and HPC communications can be supported by a single high-bandwidth, low-latency switch fabric. The embodiments are not limited to this example.

Figure 6:
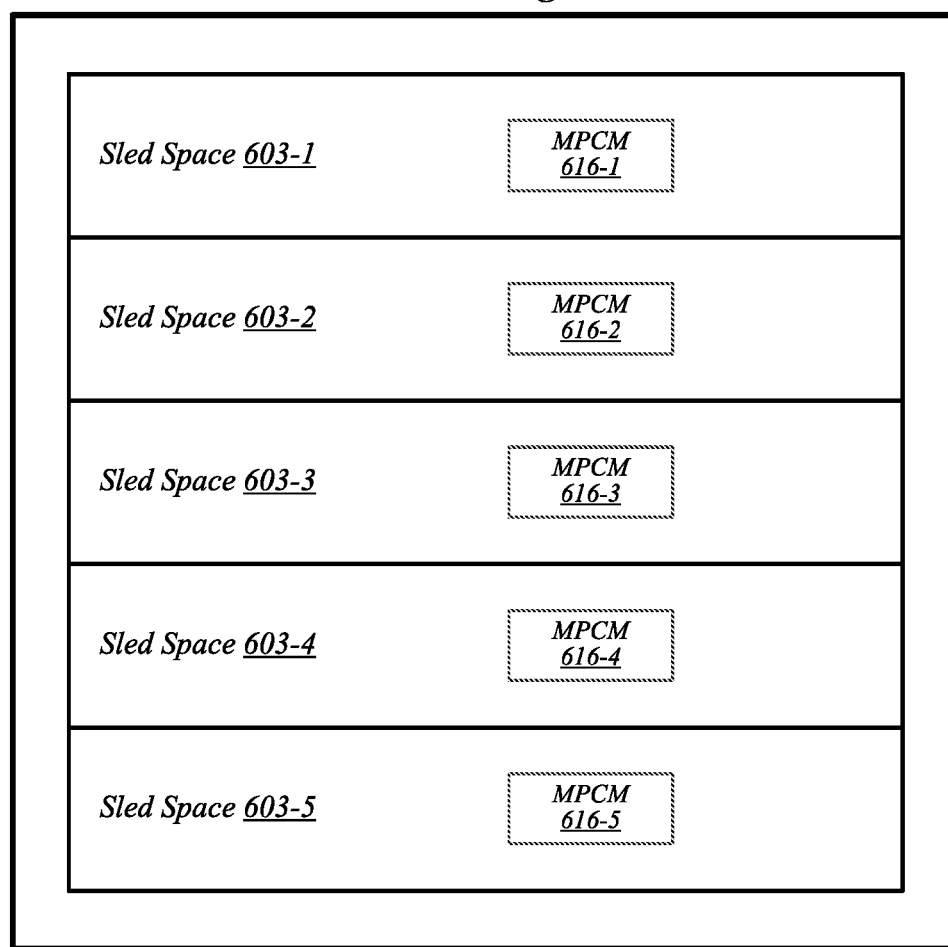
FIG. 6 is a diagram of a rack architecture that may be representative of an architecture of any particular one of the racks depicted in FIGS. 1-4 according to some embodiments.

FIG. 6 illustrates a general overview of a rack architecture 600 that may be representative of an architecture of any particular one of the racks depicted in FIGS. 1 to 4 according to some embodiments. As reflected in FIG. 6, rack architecture 600 may generally feature a plurality of sled spaces into which sleds may be inserted, each of which may be robotically-accessible via a rack access region 601. In the particular non-limiting example depicted in FIG. 6, rack architecture 600 features five sled spaces 603-1 to 603-5. Sled spaces 603-1 to 603-5 feature respective multi-purpose connector modules (MPCMs) 616-1 to 616-5.

Figure 7:
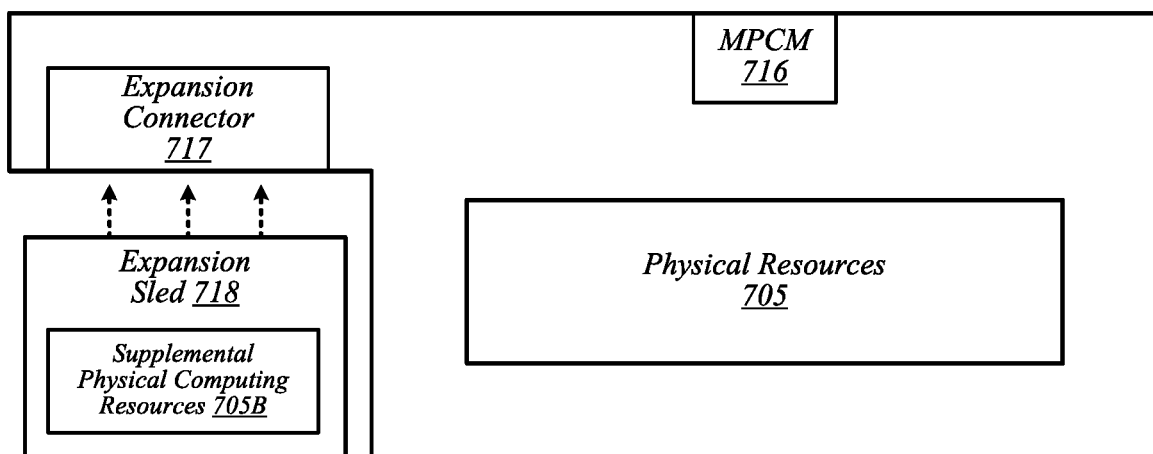
FIG. 7 is a diagram of an example embodiment of a sled that may be used with the rack architecture of FIG. 6.

FIG. 7 illustrates an example of a sled 704 that may be representative of a sled of such a type. As shown in FIG. 7, sled 704 may comprise a set of physical resources 705, as well as an MPCM 716 designed to couple with a counterpart MPCM when sled 704 is inserted into a sled space such as any of sled spaces 603-1 to 603-5 of FIG. 6. Sled 704 may also feature an expansion connector 717. Expansion connector 717 may generally comprise a socket, slot, or other type of connection element that is capable of accepting one or more types of expansion modules, such as an expansion sled 718. By coupling with a counterpart connector on expansion sled 718, expansion connector 717 may provide physical resources 705 with access to supplemental computing resources 705B residing on expansion sled 718. The embodiments are not limited in this context.

Figure 8:
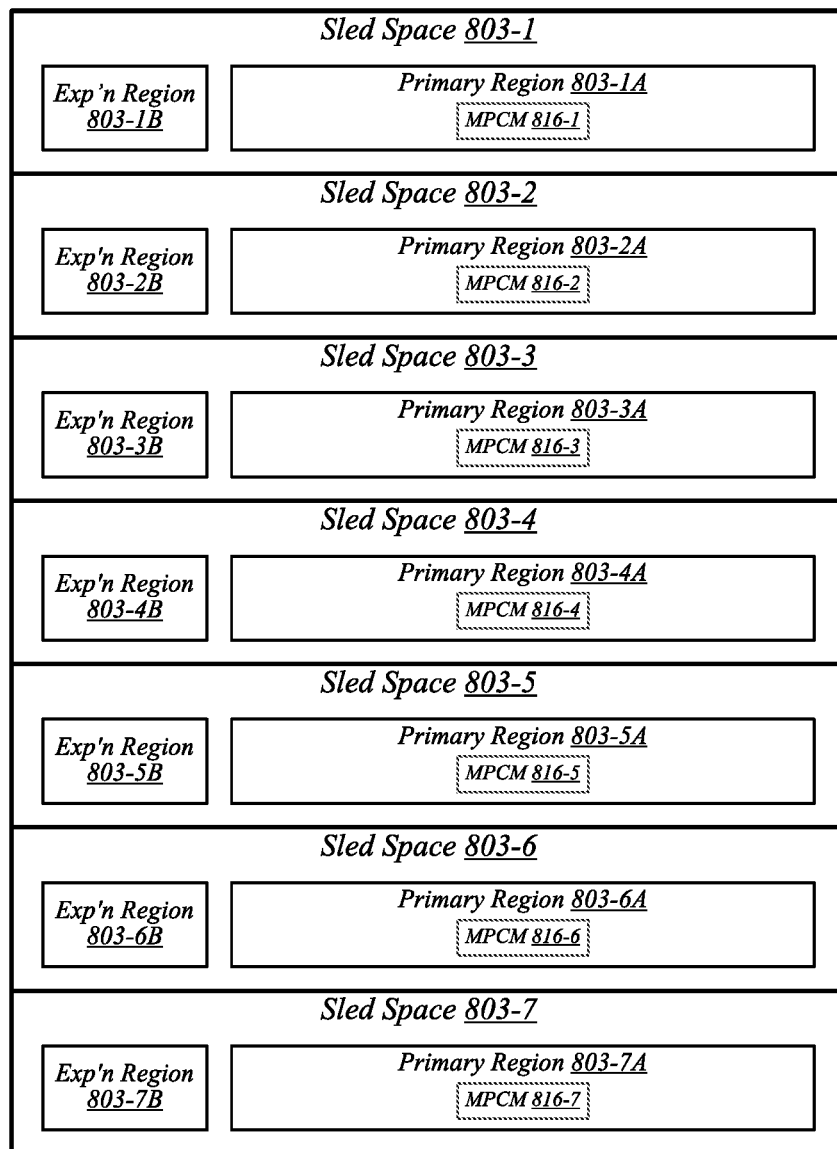
FIG. 8 is a diagram of an example embodiment of a rack architecture to provide support for sleds featuring expansion capabilities.

FIG. 8 illustrates an example of a rack architecture 800 that may be representative of a rack architecture that may be implemented in order to provide support for sleds featuring expansion capabilities, such as sled 704 of FIG. 7. In the particular non-limiting example depicted in FIG. 8, rack architecture 800 includes seven sled spaces 803-1 to 803-7, which feature respective MPCMs 816-1 to 816-7. Sled spaces 803-1 to 803-7 include respective primary regions 803-1A to 803-7A and respective expansion regions 803-1B to 803-7B. With respect to each such sled space, when the corresponding MPCM is coupled with a counterpart MPCM of an inserted sled, the primary region may generally constitute a region of the sled space that physically accommodates the inserted sled. The expansion region may generally constitute a region of the sled space that can physically accommodate an expansion module, such as expansion sled 718 of FIG. 7, in the event that the inserted sled is configured with such a module.

Figure 9:
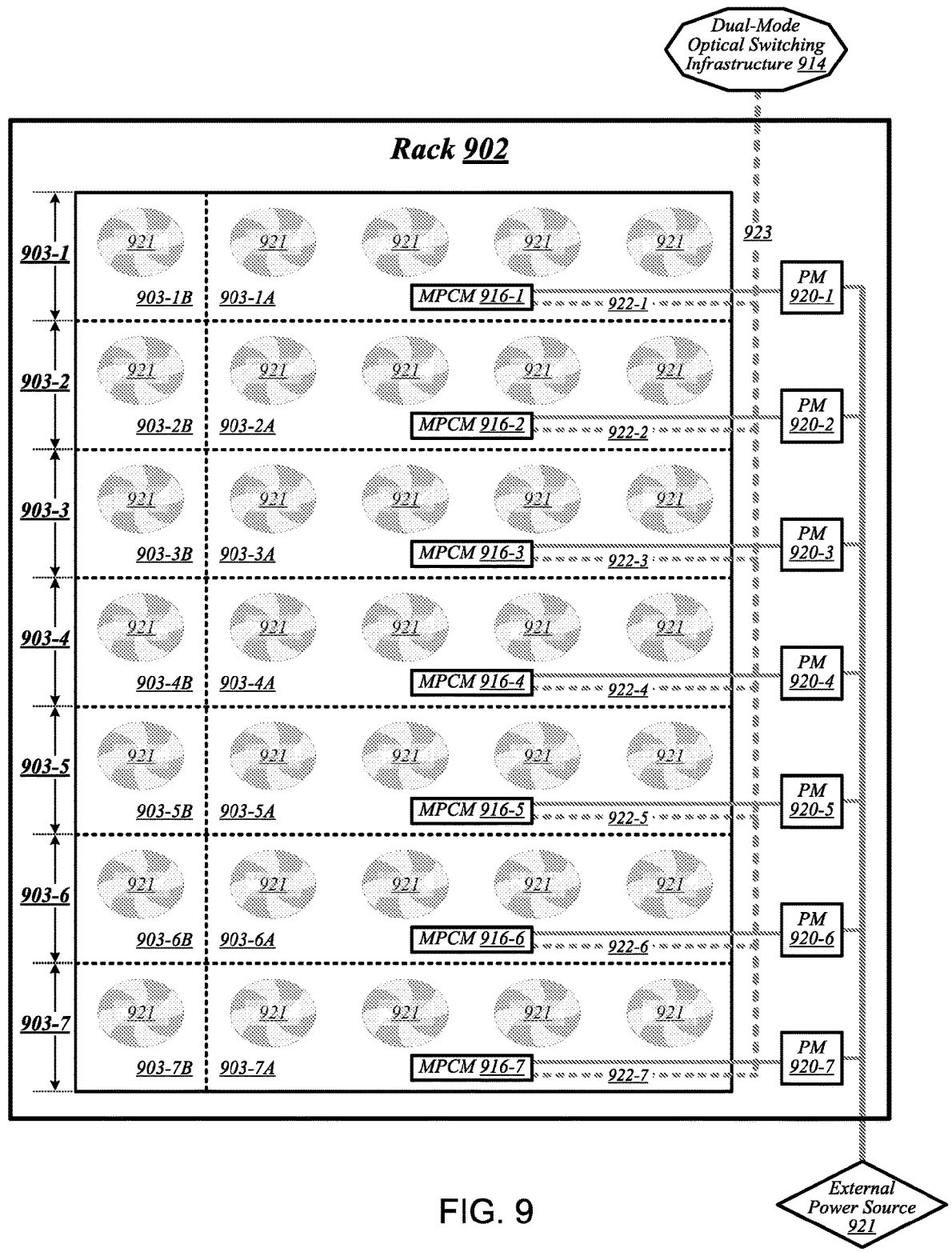
FIG. 9 is a diagram of an example embodiment of a rack implemented according to the rack architecture of FIG. 8.

FIG. 9 illustrates an example of a rack 902 that may be representative of a rack implemented according to rack architecture 800 of FIG. 8 according to some embodiments. In the particular non-limiting example depicted in FIG. 9, rack 902 features seven sled spaces 903-1 to 903-7, which include respective primary regions 903-1A to 903-7A and respective expansion regions 903-1B to 903-7B. In various embodiments, temperature control in rack 902 may be implemented using an air cooling system. For example, as reflected in FIG. 9, rack 902 may feature a plurality of fans 919 that are generally arranged to provide air cooling within the various sled spaces 903-1 to 903-7. In some embodiments, the height of the sled space is greater than the conventional "1U" server height. In such embodiments, fans 919 may generally comprise relatively slow, large diameter cooling fans as compared to fans used in conventional rack configurations. Running larger diameter cooling fans at lower speeds may increase fan lifetime relative to smaller diameter cooling fans running at higher speeds while still providing the same amount of cooling. The sleds are physically shallower than conventional rack dimensions. Further, components are arranged on each sled to reduce thermal shadowing (i.e., not arranged serially in the direction of air flow). As a result, the wider, shallower sleds allow for an increase in device performance because the devices can be operated at a higher thermal envelope (e.g., 250 W) due to improved cooling (i.e., no thermal shadowing, more space between devices, more room for larger heat sinks, etc.).

MPCMs 916-1 to 916-7 may be configured to provide inserted sleds with access to power sourced by respective power modules 920-1 to 920-7, each of which may draw power from an external power source 921. In various embodiments, external power source 921 may deliver alternating current (AC) power to rack 902, and power modules 920-1 to 920-7 may be configured to convert such AC power to direct current (DC) power to be sourced to inserted sleds. In some embodiments, for example, power modules 920-1 to 920-7 may be configured to convert 277-volt AC power into 12-volt DC power for provision to inserted sleds via respective MPCMs 916-1 to 916-7. The embodiments are not limited to this example.

MPCMs 916-1 to 916-7 may also be arranged to provide inserted sleds with optical signaling connectivity to a dual-mode optical switching infrastructure 914, which may be the same as—or similar to—dual-mode optical switching infrastructure 514 of FIG. 5. In various embodiments, optical connectors contained in MPCMs 916-1 to 916-7 may be designed to couple with counterpart optical connectors contained in MPCMs of inserted sleds to provide such sleds with optical signaling connectivity to dual-mode optical switching infrastructure 914 via respective lengths of optical cabling 922-1 to 922-7. In some embodiments, each such length of optical cabling may extend from its corresponding MPCM to an optical interconnect loom 923 that is external to the sled spaces of rack 902. In various embodiments, optical interconnect loom 923 may be arranged to pass through a support post or other type of load-bearing element of rack 902. The embodiments are not limited in this context. Because inserted sleds connect to an optical switching infrastructure via MPCMs, the resources typically spent in manually configuring the rack cabling to accommodate a newly inserted sled can be saved.

Figure 10:
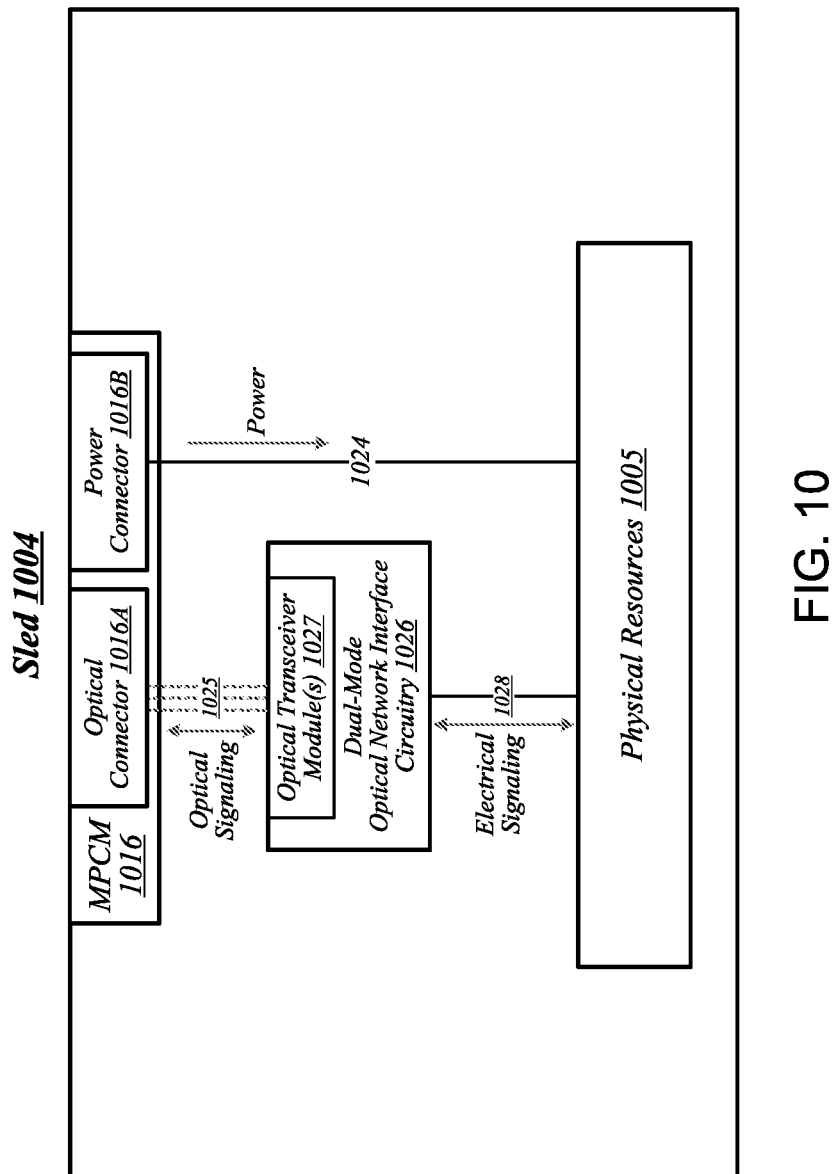
FIG. 10 is a diagram of an example embodiment of a sled designed for use in conjunction with the rack of FIG. 9.

FIG. 10 illustrates an example of a sled 1004 that may be representative of a sled designed for use in conjunction with rack 902 of FIG. 9 according to some embodiments. Sled 1004 may feature an MPCM 1016 that comprises an optical connector 1016A and a power connector 1016B, and that is designed to couple with a counterpart MPCM of a sled space in conjunction with insertion of MPCM 1016 into that sled space. Coupling MPCM 1016 with such a counterpart MPCM may cause power connector 1016 to couple with a power connector comprised in the counterpart MPCM. This may generally enable physical resources 1005 of sled 1004 to source power from an external source, via power connector 1016 and power transmission media 1024 that conductively couples power connector 1016 to physical resources 1005.

Sled 1004 may also include dual-mode optical network interface circuitry 1026. Dual-mode optical network interface circuitry 1026 may generally comprise circuitry that is capable of communicating over optical signaling media according to each of multiple link-layer protocols supported by dual-mode optical switching infrastructure 914 of FIG. 9. In some embodiments, dual-mode optical network interface circuitry 1026 may be capable both of Ethernet protocol communications and of communications according to a second, high-performance protocol. In various embodiments, dual-mode optical network interface circuitry 1026 may include one or more optical transceiver modules 1027, each of which may be capable of transmitting and receiving optical signals over each of one or more optical channels. The embodiments are not limited in this context.

Coupling MPCM 1016 with a counterpart MPCM of a sled space in a given rack may cause optical connector 1016A to couple with an optical connector comprised in the counterpart MPCM. This may generally establish optical connectivity between optical cabling of the sled and dual-mode optical network interface circuitry 1026, via each of a set of optical channels 1025. Dual-mode optical network interface circuitry 1026 may communicate with the physical resources 1005 of sled 1004 via electrical signaling media 1028. In addition to the dimensions of the sleds and arrangement of components on the sleds to provide improved cooling and enable operation at a relatively higher thermal envelope (e.g., 250 W), as described above with reference to FIG. 9, in some embodiments, a sled may include one or more additional features to facilitate air cooling, such as a heatpipe and/or heat sinks arranged to dissipate heat generated by physical resources 1005. It is worthy of note that although the example sled 1004 depicted in FIG. 10 does not feature an expansion connector, any given sled that features the design elements of sled 1004 may also feature an expansion connector according to some embodiments. The embodiments are not limited in this context.

Figure 11:
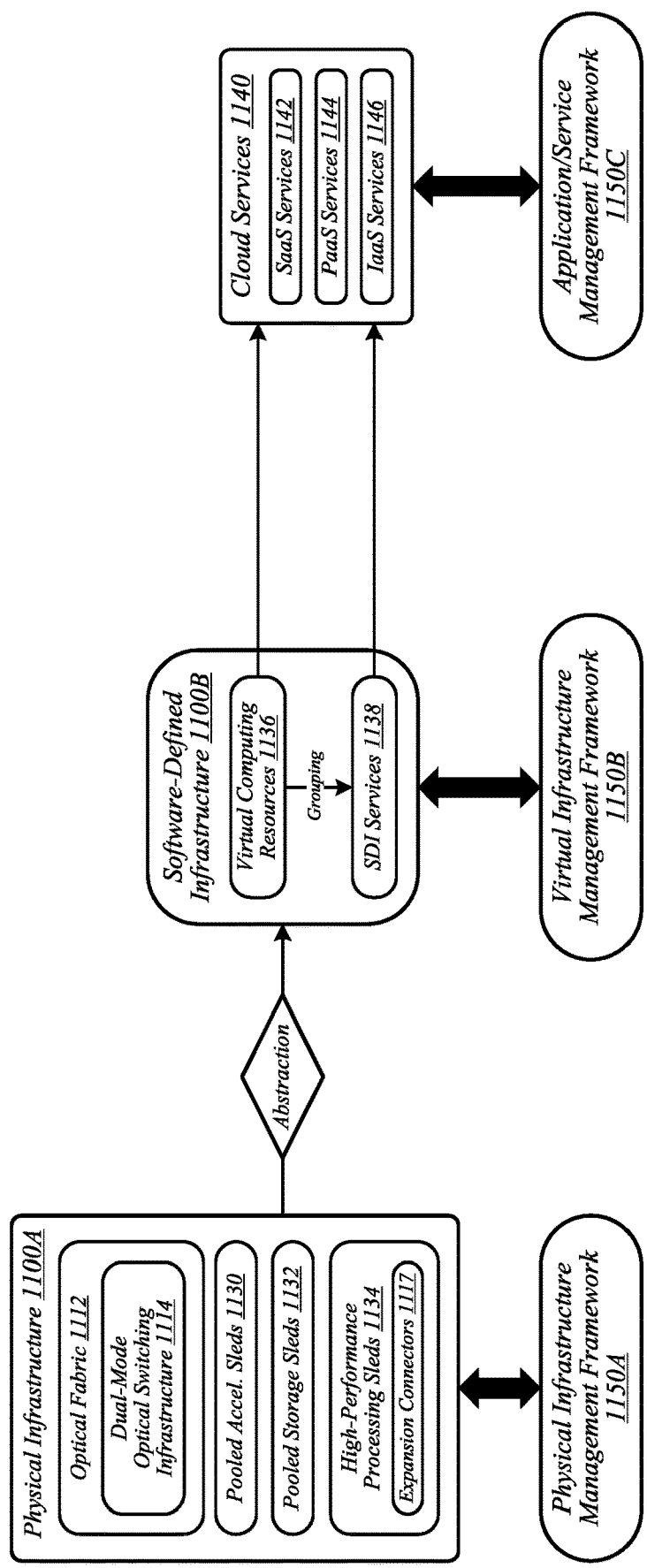
FIG. 11 is a diagram of an example embodiment of a data center in which one or more techniques described herein may be implemented according to various embodiments.

FIG. 11 illustrates an example of a data center 1100 that may generally be representative of one in/for which one or more techniques described herein may be implemented according to various embodiments. As reflected in FIG. 11, a physical infrastructure management framework 1150A may be implemented to facilitate management of a physical infrastructure 1100A of data center 1100. In various embodiments, one function of physical infrastructure management framework 1150A may be to manage automated maintenance functions within data center 1100, such as the use of robotic maintenance equipment to service computing equipment within physical infrastructure 1100A. In some embodiments, physical infrastructure 1100A may feature an advanced telemetry system that performs telemetry reporting that is sufficiently robust to support remote automated management of physical infrastructure 1100A. In various embodiments, telemetry information provided by such an advanced telemetry system may support features such as failure prediction/prevention capabilities and capacity planning capabilities. In some embodiments, physical infrastructure management framework 1150A may also be configured to manage authentication of physical infrastructure components using hardware attestation techniques. For example, robots may verify the authenticity of components before installation by analyzing information collected from a radio frequency identification (RFID) tag associated with each component to be installed. The embodiments are not limited in this context.

As shown in FIG. 11, the physical infrastructure 1100A of data center 1100 may comprise an optical fabric 1112, which may include a dual-mode optical switching infrastructure 1114. Optical fabric 1112 and dual-mode optical switching infrastructure 1114 may be the same as—or similar to— optical fabric 412 of FIG. 4 and dual-mode optical switching infrastructure 514 of FIG. 5, respectively, and may provide high-bandwidth, low-latency, multi-protocol connectivity among sleds of data center 1100. As discussed above, with reference to FIG. 1, in various embodiments, the availability of such connectivity may make it feasible to disaggregate and dynamically pool resources such as accelerators, memory, and storage. In some embodiments, for example, one or more pooled accelerator sleds 1130 may be included among the physical infrastructure 1100A of data center 1100, each of which may comprise a pool of accelerator resources—such as co-processors and/or FPGAs, for example—that is globally accessible to other sleds via optical fabric 1112 and dual-mode optical switching infrastructure 1114.

In another example, in various embodiments, one or more pooled storage sleds 1132 may be included among the physical infrastructure 1100A of data center 1100, each of which may comprise a pool of storage resources that is available globally accessible to other sleds via optical fabric 1112 and dual-mode optical switching infrastructure 1114. In some embodiments, such pooled storage sleds 1132 may comprise pools of solid-state storage devices such as solid-state drives (SSDs). In various embodiments, one or more high-performance processing sleds 1134 may be included among the physical infrastructure 1100A of data center 1100. In some embodiments, high-performance processing sleds 1134 may comprise pools of high-performance processors, as well as cooling features that enhance air cooling to yield a higher thermal envelope of up to 250 W or more. In various embodiments, any given high-performance processing sled 1134 may feature an expansion connector 1117 that can accept a far memory expansion sled, such that the far memory that is locally available to that high-performance processing sled 1134 is disaggregated from the processors and near memory comprised on that sled. In some embodiments, such a high-performance processing sled 1134 may be configured with far memory using an expansion sled that comprises low-latency SSD storage. The optical infrastructure allows for compute resources on one sled to utilize remote accelerator/FPGA, memory, and/or SSD resources that are disaggregated on a sled located on the same rack or any other rack in the data center. The remote resources can be located one switch jump away or two-switch jumps away in the spine-leaf network architecture described above with reference to FIG. 5. The embodiments are not limited in this context.

In various embodiments, one or more layers of abstraction may be applied to the physical resources of physical infrastructure 1100A in order to define a virtual infrastructure, such as a software-defined infrastructure 1100B. In some embodiments, virtual computing resources 1136 of software-defined infrastructure 1100B may be allocated to support the provision of cloud services 1140. In various embodiments, particular sets of virtual computing resources 1136 may be grouped for provision to cloud services 1140 in the form of SDI services 1138. Examples of cloud services 1140 may include—without limitation—software as a service (SaaS) services 1142, platform as a service (PaaS) services 1144, and infrastructure as a service (IaaS) services 1146.

In some embodiments, management of software-defined infrastructure 1100B may be conducted using a virtual infrastructure management framework 1150B. In various embodiments, virtual infrastructure management framework 1150B may be designed to implement workload fingerprinting techniques and/or machine-learning techniques in conjunction with managing allocation of virtual computing resources 1136 and/or SDI services 1138 to cloud services 1140. In some embodiments, virtual infrastructure management framework 1150B may use/consult telemetry data in conjunction with performing such resource allocation. In various embodiments, an application/service management framework 1150C may be implemented in order to provide QoS management capabilities for cloud services 1140. The embodiments are not limited in this context.

Figure 12:
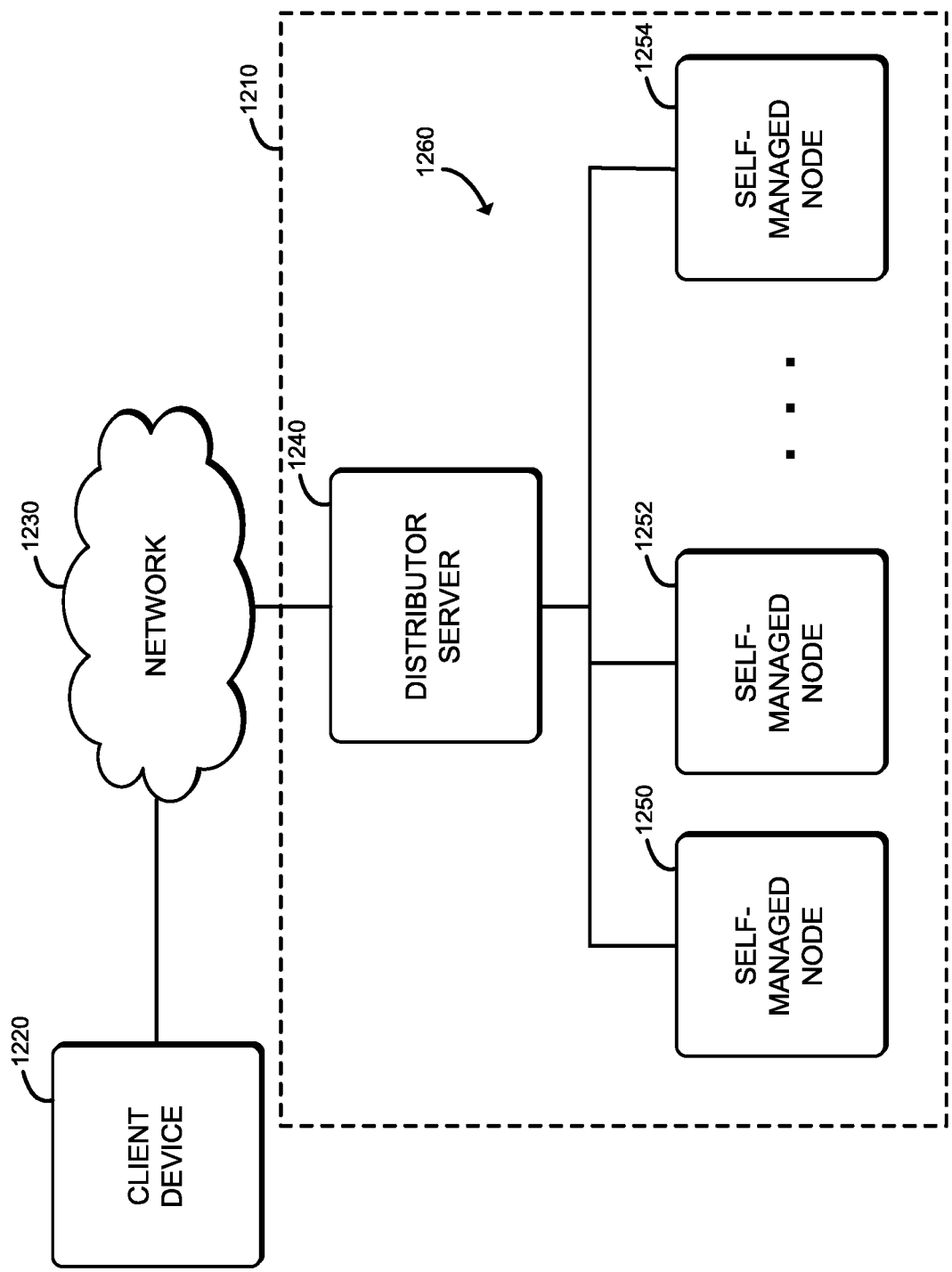
FIG. 12 is a simplified block diagram of at least one embodiment of a system for executing workloads with self-managed nodes to satisfy quality of service objectives.

As shown in FIG. 12, an illustrative system 1210 for executing workloads with self-managed nodes 1260 to satisfy quality of service objectives includes a distributor server 1240 in communication with the set of self-managed nodes 1260. Each managed node 1260 may be embodied as an assembly of resources (e.g., physical resources 206), such as compute resources (e.g., physical compute resources 205-4), storage resources (e.g., physical storage resources 205-1), accelerator resources (e.g., physical accelerator resources 205-2), or other resources (e.g., physical memory resources 205-3) from the same or different sleds (e.g., the sleds 204-1, 204-2, 204-3, 204-4, etc.) or racks (e.g., one or more of racks 302-1 through 302-32). Each managed node 1260 may be established, defined, or "spun up" by the orchestrator server 1240 at the time a workload is to be assigned to the managed node 1260 or at any other time, and may exist regardless of whether any workloads are presently assigned to the managed node 1260. The system 1210 may be implemented in accordance with the data centers 100, 300, 400, 1100 described above with reference to FIGS. 1, 3, 4, and 11. In the illustrative embodiment, the set of self-managed nodes 1260 includes self-managed nodes 1250, 1252, and 1254. While three self-managed nodes 1260 are shown in the set, it should be understood that in other embodiments, the set may include a different number of self-managed nodes 1260 (e.g., tens of thousands). The system 1210 may be located in a data center and provide storage and compute services (e.g., cloud services) to a client device 1220 that is in communication with the system 1210 through a network 1230. The distributor server 1240 may support a cloud operating environment, such as OpenStack, and the self-managed nodes 1260 may execute one or more applications or processes (i.e., workloads), such as in virtual machines or containers, on behalf of a user of the client device 1220. As discussed in more detail herein, the distributor server 1240, in operation, is configured to receive resource allocation objective data indicative of thresholds or goals ("objectives") to be satisfied during the execution of the workloads (e.g., a QoS with which to execute the workloads, a target power usage, a target temperature of the self-managed nodes 1260, etc.). Additionally, the distributor server 1240 is configured to assign workloads to the self-managed nodes 1260, provide the resource allocation data to the self-managed nodes 1260, and receive and respond to requests from the self-managed nodes 1260 as they perform the workloads. In the illustrative embodiment, the self-managed nodes 1260 identify tasks (e.g., threads, processes, sets of operations, etc.) within the workloads, continually execute their assigned workloads, allocate resources to the tasks to satisfy the received resource allocation objectives, and assess whether they can take on additional workloads or should request additional resources available in the data center 1100 to increase or maintain the achievement of the resource allocation objectives. In doing so, the self-managed nodes 1260 may generate profiles of the tasks within the workloads, identify patterns in the resource utilizations of the tasks over time (e.g., patterns of resource utilization phases), predict future resource utilizations of the tasks, and adjust the allocation and availability of resources in view of the present and predicted resource utilizations to consistently satisfy the resource allocation objectives (e.g., quality of service objectives).

In the illustrative embodiment, the achievement of a resource allocation objective may be measured, equal to, or otherwise defined as the degree to which a measured value from one or more self-managed nodes 1260 satisfies a target value associated with the resource allocation objective. For example, in the illustrative embodiment, increasing the achievement may be performed by decreasing the error (e.g., difference) between the measured value (e.g., a latency in performing a task, a power consumption of a self-managed node 1260, an operating temperature of a self-managed node 1260, etc.) and the target value (e.g., a target latency, a target power consumption, a target operating temperature, etc.). Conversely, decreasing the achievement may be performed by increasing the error (e.g., difference) between the measured value and the target value.

Figure 13:
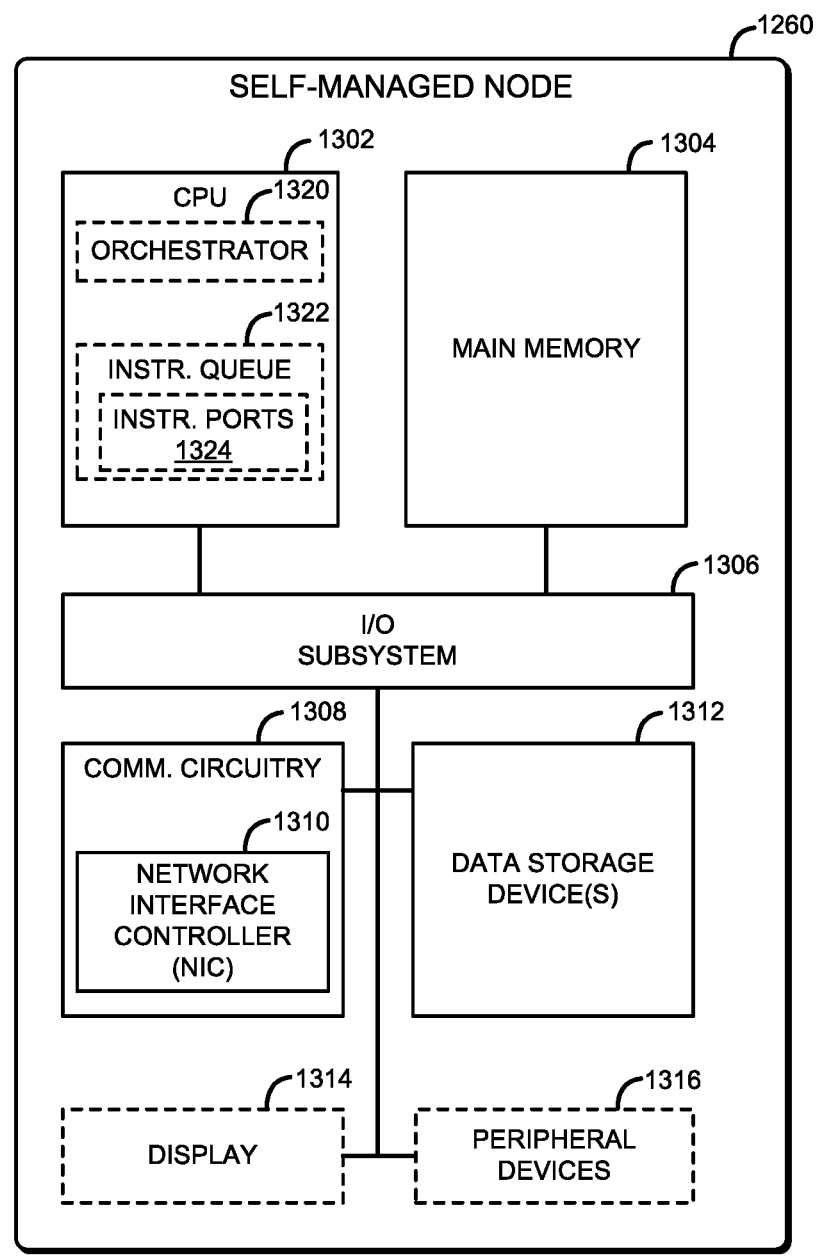
FIG. 13 is a simplified block diagram of at least one embodiment of a self-managed node of the system of FIG. 12.

Referring now to FIG. 13, each self-managed node 1260 may be embodied as any type of compute device capable of performing the functions described herein, including receiving resource allocation objective data indicative of resource allocation objectives, executing workloads, analyzing telemetry data indicative of performance and conditions (e.g., resource utilization, one or more temperatures, fan speeds, etc.) as the workloads are executed, and allocating resources among tasks within the workloads to increase the achievement of resource allocation objectives as the workloads are performed. For example, the self-managed node 1260 may be embodied as a computer, a distributed computing system, one or more sleds (e.g., the sleds 204-1, 204-2, 204-3, 204-4, etc.), a server (e.g., stand-alone, rack-mounted, blade, etc.), a multiprocessor system, a network appliance (e.g., physical or virtual), a desktop computer, a workstation, a laptop computer, a notebook computer, a processor-based system, or a network appliance. As shown in FIG. 13, the illustrative self-managed node 1260 includes a central processing unit (CPU) 1302, a main memory 1304, an input/output (I/O) subsystem 1306, communication circuitry 1308, and one or more data storage devices 1312. Of course, in other embodiments, the self-managed node 1260 may include other or additional components, such as those commonly found in a computer (e.g., display, peripheral devices, etc.). Additionally, in some embodiments, one or more of the illustrative components may be incorporated in, or otherwise form a portion of, another component. For example, in some embodiments, the main memory 1304, or portions thereof, may be incorporated in the CPU 1302.

The CPU 1302 may be embodied as any type of processor capable of performing the functions described herein. The CPU 1302 may be embodied as a single or multi-core processor(s), a microcontroller, or other processor or processing/controlling circuit. In some embodiments, the CPU 1302 may be embodied as, include, or be coupled to a field programmable gate array (FPGA), an application specific integrated circuit (ASIC), reconfigurable hardware or hardware circuitry, or other specialized hardware to facilitate performance of the functions described herein. In the illustrative embodiment, the CPU 1302 includes an orchestrator 1320 which may be embodied as dedicated circuitry and/or components to obtain telemetry data indicative of conditions within the self-managed node 1260 as the self-managed node 1260 executes workloads and allocates resources to tasks within each workload to increase or maintain the achievement of the resource allocation objectives. Further, in the illustrative embodiment, the CPU 1302 includes an instruction queue 1322 which may be embodied as, or include, any circuitry and/or components to maintain a queue of instructions to be processed by the CPU 1302. Additionally, the instruction queue 1322, in the illustrative embodiment, includes multiple instruction ports 1324 which may be embodied as or include circuitry and/or components to receive instructions of various types (e.g., encryption-related instructions, compression-related instructions, database-related instructions, branch instructions, compare instructions, etc.) and provide the instructions to corresponding circuitry and/or other components in the CPU 1302 for processing. As described herein, the instruction queue 1322 may apply different priority levels to the different instruction ports 1324 such that certain instruction types receive more processing capacity (e.g., more processor cycles, more logic gates, etc.) than other instruction types. As discussed above, the managed node 1260 may include resources distributed across multiple sleds and in such embodiments, the CPU 1302 may include portions thereof located on the same sled or different sled. The main memory 1304 may be embodied as any type of volatile (e.g., dynamic random access memory (DRAM), etc.) or non-volatile memory or data storage capable of performing the functions described herein. In some embodiments, all or a portion of the main memory 1304 may be integrated into the CPU 1302. In operation, the main memory 1304 may store various software and data used during operation such as telemetry data, quality of service (QoS) data, resource allocation objective data, workload labels, workload classifications, workload adjustment data, operating systems, applications, programs, libraries, and drivers. As discussed above, the managed node 1260 may include resources distributed across multiple sleds and in such embodiments, the main memory 1304 may include portions thereof located on the same sled or different sled.

The I/O subsystem 1306 may be embodied as circuitry and/or components to facilitate input/output operations with the CPU 1302, the main memory 1304, and other components of the self-managed node 1260. For example, the I/O subsystem 1306 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 1306 may form a portion of a system-on-a-chip (SoC) and be incorporated, along with one or more of the CPU 1302, the main memory 1304, and other components of the self-managed node 1260, on a single integrated circuit chip.

The communication circuitry 1308 may be embodied as any communication circuit, device, or collection thereof, capable of enabling communications over the network 1230 between the self-managed node 1260 and another compute device (e.g., the distributor server 1240 and/or other self-managed nodes 1260). The communication circuitry 1308 may be configured to use any one or more communication technology (e.g., wired or wireless communications) and associated protocols (e.g., Ethernet, Bluetooth®, Wi-Fi®, WiMAX, etc.) to effect such communication.

The illustrative communication circuitry 1308 includes a network interface controller (NIC) 1310, which may also be referred to as a host fabric interface (HFI). The NIC 1310 may be embodied as one or more add-in-boards, daughtercards, network interface cards, controller chips, chipsets, or other devices that may be used by the self-managed node 1260 to connect with another compute device (e.g., the distributor server 1240 and/or other self-managed nodes 1260). In some embodiments, the NIC 1310 may be embodied as part of a system-on-a-chip (SoC) that includes one or more processors, or included on a multichip package that also contains one or more processors. In some embodiments, the NIC 1310 may include a local processor (not shown) and/or a local memory (not shown) that are both local to the NIC 1310. In such embodiments, the local processor of the NIC 1310 may be capable of performing one or more of the functions of the CPU 1302 described herein. Additionally or alternatively, in such embodiments, the local memory of the NIC 1310 may be integrated into one or more components of the self-managed node 1260 at the board level, socket level, chip level, and/or other levels. As discussed above, the managed node 1260 may include resources distributed across multiple sleds and in such embodiments, the communication circuitry 1308 may include portions thereof located on the same sled or different sled.

The one or more illustrative data storage devices 1312, may be embodied as any type of devices configured for short-term or long-term storage of data such as, for example, memory devices and circuits, memory cards, hard disk drives, solid-state drives, or other data storage devices. Each data storage device 1312 may include a system partition that stores data and firmware code for the data storage device 1312. Each data storage device 1312 may also include an operating system partition that stores data files and executables for an operating system.

Additionally, the self-managed node 1260 may include a display 1314. The display 1314 may be embodied as, or otherwise use, any suitable display technology including, for example, a liquid crystal display (LCD), a light emitting diode (LED) display, a cathode ray tube (CRT) display, a plasma display, and/or other display usable in a compute device. The display 1314 may include a touchscreen sensor that uses any suitable touchscreen input technology to detect the user's tactile selection of information displayed on the display including, but not limited to, resistive touchscreen sensors, capacitive touchscreen sensors, surface acoustic wave (SAW) touchscreen sensors, infrared touchscreen sensors, optical imaging touchscreen sensors, acoustic touchscreen sensors, and/or other type of touchscreen sensors.

Additionally or alternatively, the self-managed node 1260 may include one or more peripheral devices 1316. Such peripheral devices 1316 may include any type of peripheral device commonly found in a compute device such as speakers, a mouse, a keyboard, and/or other input/output devices, interface devices, and/or other peripheral devices.

The client device 1220 and the distributor server 1240 may have components similar to those described in FIG. 13. The description of those components of the self-managed node 1260 is equally applicable to the description of components of the client device 1220 and the distributor server 1240 and is not repeated herein for clarity of the description, with the exception that, in the illustrative embodiment, the client device 1220 and the distributor server 1240 do not include the orchestrator 1320. It should be appreciated that any of the client device 1220 and the distributor server 1240 may include other components, sub-components, and devices commonly found in a computing device, which are not discussed above in reference to the self-managed node 1260 and not discussed herein for clarity of the description.

As described above, the client device 1220, the distributor server 1240 and the self-managed nodes 1260 are illustratively in communication via the network 1230, which may be embodied as any type of wired or wireless communication network, including global networks (e.g., the Internet), local area networks (LANs) or wide area networks (WANs), cellular networks (e.g., Global System for Mobile Communications (GSM), 3G, Long Term Evolution (LTE), Worldwide Interoperability for Microwave Access (WiMAX), etc.), digital subscriber line (DSL) networks, cable networks (e.g., coaxial networks, fiber networks, etc.), or any combination thereof.

Figure 14:
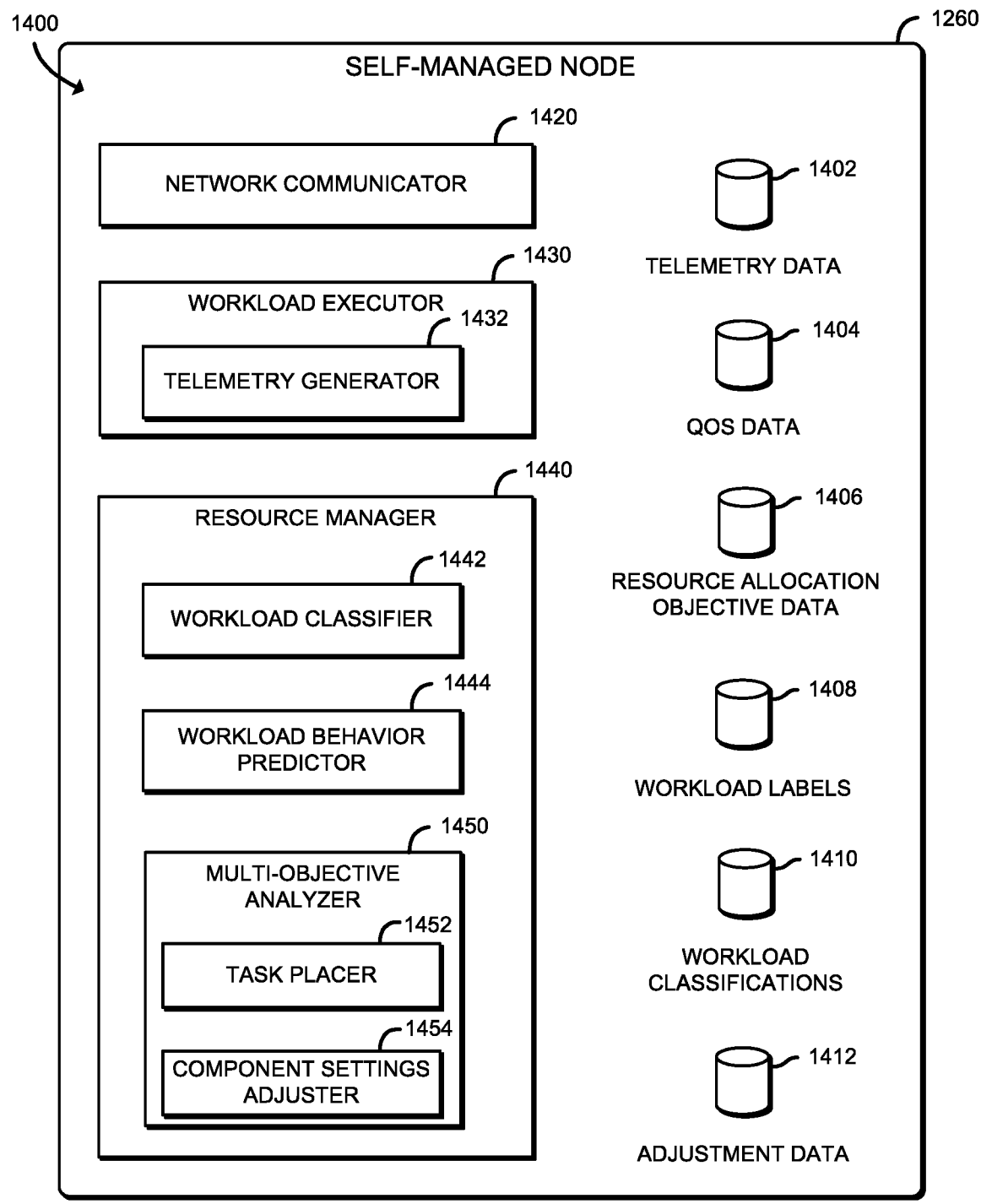
FIG. 14 is a simplified block diagram of at least one embodiment of an environment that may be established by a self-managed node of FIGS. 12 and 13.

Referring now to FIG. 14, in the illustrative embodiment, each self-managed node 1260 may establish an environment 1400 during operation. The illustrative environment 1400 includes a network communicator 1420, a workload executor 1430, and a resource manager 1440. Each of the components of the environment 1400 may be embodied as hardware, firmware, software, or a combination thereof. As such, in some embodiments, one or more of the components of the environment 1400 may be embodied as circuitry or a collection of electrical devices (e.g., network communicator circuitry 1420, workload executor circuitry 1430, resource manager circuitry 1440, etc.). It should be appreciated that, in such embodiments, one or more of the network communicator circuitry 1420, workload executor circuitry 1430, or resource manager circuitry 1440 may form a portion of one or more of the CPU 1302, the main memory 1304, the I/O subsystem 1306, and/or other components of the self-managed node 1260. In the illustrative embodiment, the environment 1400 includes telemetry data 1402 which may be embodied as data indicative of the performance and conditions (e.g., resource utilization, operating frequencies, power usage, one or more temperatures, fan speeds, etc.) of the self-managed node 1260 as the self-managed nodes 1260 executes the workloads assigned to it. Additionally, the illustrative environment 1400 includes quality of service (QoS) data 1404 indicative of latencies associated with the execution of workloads (e.g., the amount of time that has elapsed to complete a task within a workload), and priorities (e.g., degree of precedence for available resources) assigned to each workload. In the illustrative embodiment, the environment 1400 also includes resource allocation objective data 1406 which may be embodied as any data indicative of user-defined thresholds or goals ("objectives") to be satisfied during the execution of the workloads. In the illustrative embodiment, the objectives pertain to performance (e.g., quality of service, such as a target latency or priority for each workload), power consumption of components, life expectancy of components, and/or heat production of the self-managed node 1260.

Further, the illustrative environment 1400 includes workload labels 1408 which may be embodied as any identifiers (e.g., process numbers, executable file names, alphanumeric tags, etc.) assigned by the distributor server 1240 that uniquely identify each workload to be executed by the self-managed node 1260. In addition, the illustrative environment 1400 includes workload classifications 1410 which may be embodied as any data indicative of the general resource utilization tendencies of each workload (e.g., processor intensive, memory intensive, network bandwidth intensive, etc.). Further, the illustrative environment 1400 includes adjustment data 1412 which may be embodied as any data indicative of adjustments, determined by the self-managed node 1260 to the allocation of resources to the tasks within the workloads and/or to the settings of components (e.g., the CPU 1302, the memory 1304, the one or more data storage devices 1312, etc.) within or available to the self-managed node 1260 (e.g., allocated from another self-managed node 1260 in the data center 1100) to adjust their operation such as target power usage of the components, processor capacity (e.g., a number of cores to be used, a clock speed, a percentage of available processor cycles, etc.), memory resource capacity (e.g., amount of memory to be used and/or frequency of memory accesses to volatile memory and/or non-volatile memory), communication circuitry capacity (e.g., network bandwidth), and/or target operating temperatures and fan speeds.

In the illustrative environment 1400, the network communicator 1420, which may be embodied as hardware, firmware, software, virtualized hardware, emulated architecture, and/or a combination thereof as discussed above, is configured to facilitate inbound and outbound network communications (e.g., network traffic, network packets, network flows, etc.) to and from the self-managed node 1260, respectively. To do so, the network communicator 1420 is configured to receive and process data packets and to prepare and send data packets to a system or compute device (e.g., the distributor server 1240). Accordingly, in some embodiments, at least a portion of the functionality of the network communicator 1420 may be performed by the communication circuitry 1308, and, in the illustrative embodiment, by the NIC 1310.

The workload executor 1430, which may be embodied as hardware, firmware, software, virtualized hardware, emulated architecture, and/or a combination thereof as discussed above, is configured to execute workloads assigned to the self-managed node 1260 using resources allocated to each task within each workload by the resource manager 1440. In the illustrative embodiment, the workload executor 1430 includes a telemetry generator 1432 configured to generate the telemetry data 1402 as the tasks within the workloads are performed. The telemetry generator 1432 may actively poll each of the components (e.g., the CPU 1302, the memory 1304, the I/O subsystem 1306, the communication circuitry 1308, the data storage devices 1312, etc.) available within the self-managed node 1260 or available from another self-managed node 1260 that has allocated one or more resources to the workloads performed by the present self-managed node 1260 for updated telemetry data 1402 on an ongoing basis or may passively receive telemetry data 1402 from the components, such as by monitoring one or more performance counters, registers, and/or listening on a particular network port for updated telemetry data 1402. The telemetry generator 1432 may further parse and categorize the telemetry data 1402, such as by separating the telemetry data 1402 into an individual file or data set for each type of resource utilized by the workloads, each workload executed by the self-managed node 1260, and/or each task within each workload.

The resource manager 1440, which may be embodied as hardware, firmware, software, virtualized hardware, emulated architecture, and/or a combination thereof, is configured to generate QoS data 1404 and other data analytics from the telemetry data 1402, identify the workloads, classify the workloads, predict the future resource utilizations of the tasks within the workloads, and dynamically (e.g., on an ongoing basis) reallocate resources available to the self-managed node 1260 to increase the achievement of the quality of service objectives and other resource allocation objectives (e.g., satisfy a threshold power consumption) without adversely affecting the achievement of any other resource allocation objectives. To do so, the resource manager 1440 includes a workload classifier 1442, a workload behavior predictor 1444, and a multi-objective analyzer 1450.

The workload classifier 1442 in the illustrative embodiment, is configured to categorize each labeled workload and task within each workload based on the average resource utilization of each workload and task within each workload (e.g., generally utilizes 65% of processor capacity, generally utilizes 40% of memory capacity, etc.). The workload behavior predictor 1444, in the illustrative embodiment, is configured to analyze the telemetry data 1402 to identify different phases of resource utilization within the telemetry data 1402 for each task within each workload. Each resource utilization phase may be embodied as a period of time in which the resource utilization of one or more resources allocated to the self-managed node 1260 satisfies a predefined threshold. For example, a utilization of at least 85% of the allocated processor capacity may be indicative of a high processor utilization phase, and a utilization of at least 85% of the allocated memory capacity may be indicative of a high memory utilization phase. In the illustrative embodiment, the workload behavior predictor 1444 is further to identify patterns in the resource utilization phases of the tasks in the workloads (e.g., a high processor utilization phase, followed by a high memory utilization phase, followed by a phase of low resource utilization, which is then followed by the high processor utilization phase again). The workload behavior predictor 1444 may be configured to utilize the identifications of the resource utilization phase patterns, determine the present resource utilization phases of given tasks within a workload, predict the next resource utilization phases based on the patterns, and determine the amount of remaining time until each of the tasks in the workload transition to their next resource utilization phases. The multi-objective analyzer 1450, in the illustrative embodiment, is configured to balance the resource allocation objectives defined in the resource allocation objective data 1406, determine, based on the telemetry data 1402 and QoS data 1404, whether the present allocation of the resources in the self-managed node 1260 is Pareto-efficient (e.g., that no adjustment can be made without decreasing the achievement of one or more other resource allocation objectives), and if not, determine an adjustment that provides a Pareto improvement (e.g., an increase in the achievement of at least one of the objectives without decreasing the achievement of any of the other objectives).

In the illustrative embodiment, the multi-objective analyzer 1450 may model or simulate the resources (e.g., CPU 1302, memory 1304, communication circuitry 1308, data storage devices 1312, etc.) available to the self-managed node 1260 to determine the total power consumption, heat generation, compute capacity, and other factors in response to various adjustments to the allocations of the resources among the tasks of the workloads assigned to the self-managed node 1260 and/or adjustments to the settings of the components (e.g., operating frequency, etc.), define a Pareto frontier indicative of a set of resource allocations that are all Pareto-efficient, determine whether the present resource allocation is already on the Pareto frontier, and if not, what adjustment to the allocations would reach the Pareto frontier. The multi-objective analyzer 1450 may determine the Pareto frontier, P(Y), as follows:

$$f: R^n \rightarrow R^m \qquad \text{(Equation 1)}$$

In the above equation, $f$ is a function of the set of resources available to self-managed node 1260 (either within the self-managed node 1260 or available through the network), modeled by the multi-objective analyzer 1450, that is indicative of the response of the resources to adjustments to the assignments of workloads. $R^n$ is a metric space of possible allocations of the resources to the tasks within the workloads and R$^m$ represents a set of criterion vectors. In the following equation, X is a compact set of feasible decisions in the metric space, R$^n$, and Y is the feasible set of criterion vectors in R$^m$, as follows:

$$Y=\{y\in R^m: y=f(x), x\in X\} \quad \text{(Equation 2)}$$

Furthermore, a point y" defined in Equation 3 below dominates another point y' defined in Equation 4.

$$y''\in R^m \quad \text{(Equation 3)}$$

$$y'\in R^m \quad \text{(Equation 4)}$$

As such, the Pareto frontier may be represented as follows:

$$P(Y)=\{y'\in Y: \{y''\in Y: y''>y', y''\neq y'\}=\emptyset\} \quad \text{(Equation 5)}$$

The task placer 1452, in the illustrative embodiment, is configured to assign tasks to one or more cores of the compute resources (e.g., the CPU 1302) and potentially reassign at least some of the tasks as the workloads are performed, to provide a Pareto improvement (e.g., an adjustment that improves the achievement of at least one resource allocation objective without decreasing the achievement of any other resource allocation objectives). For example, some cores may operate at a different clock speed, or may be more heavily loaded with tasks, than other cores. The component settings adjuster 1454, in the illustrative embodiment, is configured to apply one or more adjustments to the settings of components within the self-managed node 1260 or available to the self-managed node 1260 (e.g., components physically located in other self-managed nodes 1260 that have been allocated to the present self-managed node 1260), to affect the performance characteristics of those components. The settings may be associated with the operating system and/or the firmware or drivers of the components of the self-managed nodes 1260.

It should be appreciated that each of the workload classifier 1442, the workload behavior predictor 1444, the multi-objective analyzer 1450, the task placer 1452, and the component settings adjuster 1454 may be separately embodied as hardware, firmware, software, virtualized hardware, emulated architecture, and/or a combination thereof. For example, the workload classifier 1442 may be embodied as a hardware component, while the workload behavior predictor 1444, the multi-objective analyzer 1450, the task placer 1452, and the component settings adjuster 1454 are embodied as virtualized hardware components or as some other combination of hardware, firmware, software, virtualized hardware, emulated architecture, and/or a combination thereof.

Figure 15:
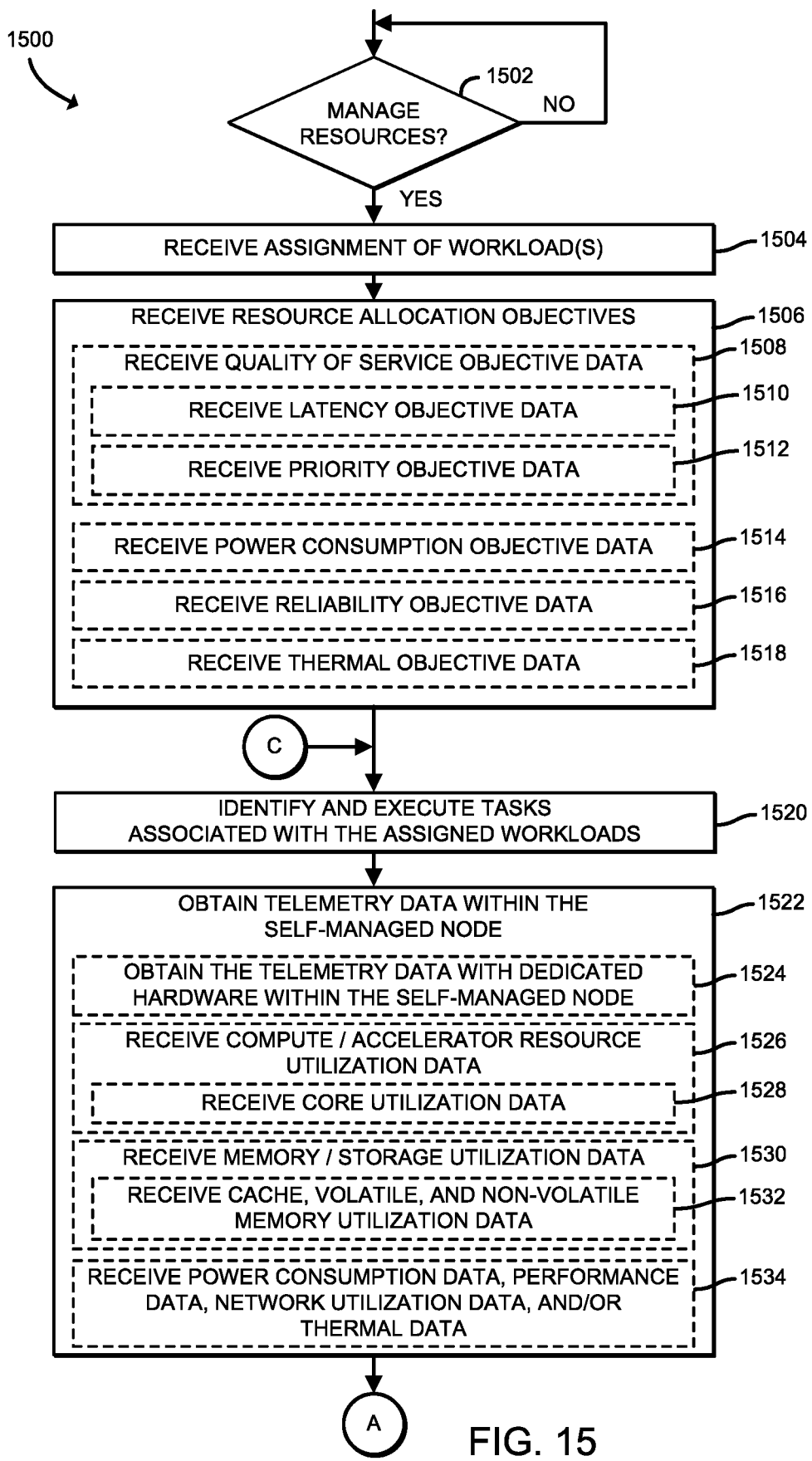
FIGS. 15-17 are a simplified flow diagram of at least one embodiment of a method for managing the allocation of resources to satisfy quality of service objectives that may be performed by each self-managed node of FIGS. 12-14.

Referring now to FIG. 15, in use, each self-managed node 1260 may execute a method 1500 for managing the allocation of resources to satisfy quality of service objectives as the workloads are executed. The method 1500 begins with block 1502, in which the self-managed node 1260 determines whether to manage the allocation of resources available to the self-managed node 1260 during the execution of workloads. In the illustrative embodiment, the self-managed node 1260 determines to manage the allocation of resources if the self-managed node 1260 is powered on and in communication with the distributor server 1240. In other embodiments, the self-managed node 1260 may determine whether to manage resources based on other factors. Regardless, in response to a determination to manage the allocation of resources, in the illustrative embodiment, the method 1500 advances to block 1504 in which the self-managed node 1260 receives an assignment of one or more workloads. In the illustrative embodiment, in receiving the assignment, the self-managed node 1260 receives the labels (e.g., workload labels 1408) of the assigned workloads from the distributor server 1240. In block 1506, the self-managed node 1260 receives resource allocation objectives (e.g., the resource allocation objective data 1406), from the distributor server 1240. In doing so, the self-managed node 1260 may receive quality of service objective data, as indicated in block 1508. In the illustrative embodiment, the quality of service objective data is associated with each workload that was assigned to the self-managed node 1260 such that one workload may have a higher quality of service associated with it than another workload assigned to the self-managed node 1260. For example, the quality of service objective data may indicate a workload label and a corresponding quality of service objective. As indicated in block 1510, in receiving the quality of service objective data, the self-managed node 1260 may receive latency objective data indicative of a target (e.g., a maximum desired) latency (e.g., time period), such as a number of milliseconds, for completing tasks within the workload (e.g., a compression task, an authentication task, etc.). Additionally or alternatively, as indicated in block 1512, in receiving the quality of service objective data, the self-managed node 1260 may receive priority objective data associated with each workload or type of instruction. As described above, with reference to FIG. 13, the CPU 1302, in the illustrative embodiment, includes instruction ports 1324, which may each receive different types of instructions and may be assigned different priorities. As the workloads may be dominated by certain types of instructions (e.g., encryption-related instructions, compression-related instructions, database-related instructions, etc.), by controlling the priority of particular types of instructions, the self-managed node 1260 may control the quality of service for the corresponding workloads. In the illustrative embodiment, the priority objective data is a desired priority (e.g., precedence in receiving resources) of each assigned workload relative to other workloads assigned to the self-managed node 1260.

In the illustrative embodiment, the self-managed node 1260 may additionally receive power consumption objective data indicative of a target power usage or threshold amount of power usage of the self-managed node 1260 as it executes the workloads, as indicated in block 1514. The self-managed node 1260 may also receive reliability objective data indicative of a target life cycle of one or more of the self-managed nodes 1260 or components therein (e.g., a target life cycle of a data storage device, a target life cycle of a cooling fan, etc.), as indicated in block 1516. As indicated in block 1518, the self-managed node 1260 may also receive thermal objective data indicative of one or more target temperatures of one or more components (e.g., the CPU 1302, the memory 1304, etc.) of the self-managed node 1260.

In block 1520, the self-managed node 1260 identifies and executes tasks associated with (e.g., within) the assigned workloads. In doing so, the self-managed node 1260 may not have knowledge of the actual resource requirements of the workloads, as no telemetry data has been generated yet. Accordingly, the self-managed node 1260 may initially place the tasks of workloads with higher QoS objectives to cores having higher clock speeds and may otherwise assign relatively larger amounts of resources to the workloads having higher QoS objectives than to the assigned workloads having lower QoS objectives. In block 1522, in the illustrative embodiment, the self-managed node 1260 obtains the telemetry data 1402 within the self-managed node 1260. In doing so, as indicated in block 1524, the self-managed node 1260 may obtain the telemetry data 1402 with dedicated hardware, such as the orchestrator 1320, within the self-managed node 1260. Furthermore, as indicated in block 1526, the self-managed node 1260 may receive compute and/or accelerator resource utilization data indicative of an amount of processor and/or accelerator capacity consumed by each task of each workload performed by the self-managed node 1260. In doing so, the self-managed node 1260 may receive core utilization data indicative of the particular core that a task was executed on and the percentage of the capacity of the core that was utilized by the task (e.g., the percentage of available cycles of the core that were used by the task, the percentage of total instructions per second that were associated with the task, etc.), as indicated in block 1528. Moreover, as indicated in block 1530, the self-managed node 1260 may receive memory and data storage utilization data for each task of each workload. The memory and data storage utilization data may be embodied as Intel Cache Allocation Technology (CAT) data, Intel Cache Monitoring Technology (CMT) data, Intel Memory Bandwidth Monitoring (MBM) data, and/or other data indicative of an amount or frequency of memory and data storage use by each task of each workload performed by the self-managed node 1260. In receiving the memory utilization data, the self-managed node 1260 may receive cache utilization data indicative of a frequency of cache accesses associated with a task and/or cache miss rate information, volatile memory utilization data indicative of an amount volatile memory (e.g., the main memory 1304) used, a frequency of accesses to the volatile memory, page fault data, and/or other information indicative of the utilization of the volatile memory available to the self-managed node 1260, and/or non-volatile memory utilization data indicative of the amount of data stored and/or retrieved from the data storage devices 1312 and/or a frequency at which each task issued write requests and/or read requests to the data storage devices 1312, as indicated in block 1532.

As indicated in block 1534, the self-managed node 1260 may also receive power consumption data indicative of an amount of power (e.g., Watts) consumed by each component, performance data indicative of a speed with which the tasks of the workloads are performed (e.g., latencies), network utilization data indicative of an amount of network bandwidth (e.g., capacity of the communication circuitry) used by each task of each workload performed by the self-managed node 1260, and thermal data indicative of one or more temperatures of components within the self-managed node 1260. After obtaining the telemetry data 1402, the method 1500 advances to block 1536 of FIG. 16, in which the self-managed node 1260 generates the data analytics from the telemetry data 1402 as the workloads are being performed.

Figure 16:
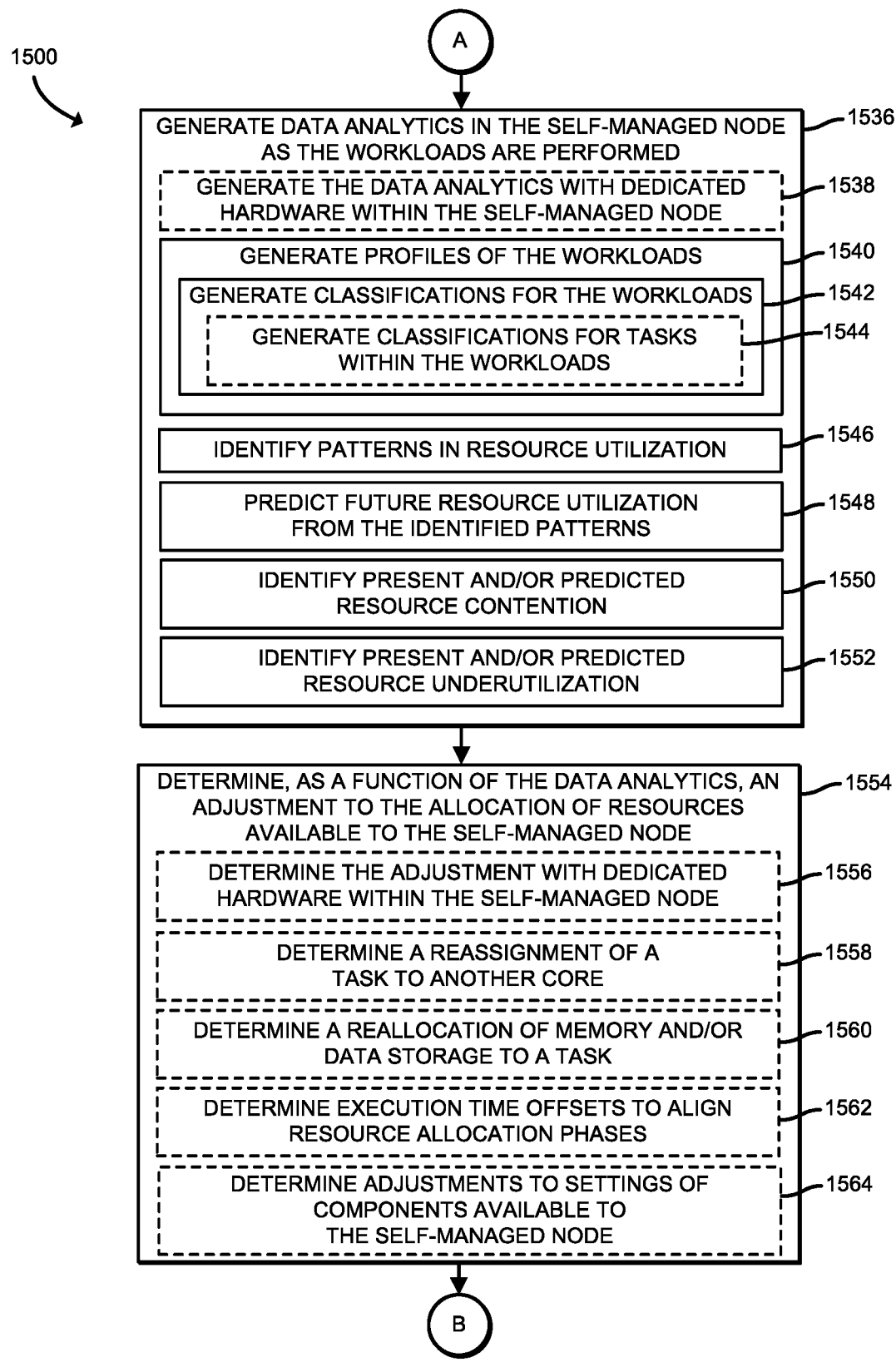

Referring now to FIG. 16, in generating the data analytics, the self-managed node 1260, in the illustrative embodiment, generates the data analytics with dedicated hardware (e.g., the orchestrator 1320) within the self-managed node 1260, as indicated in block 1538. Further, in the illustrative embodiment, in generating the data analytics, the self-managed node 1260 generates profiles of the workloads, as indicated in block 1540. In doing so, in the illustrative embodiment, the self-managed node 1260 generates the classifications 1410 of the workloads, as indicated in block 1542. In the illustrative embodiment, in generating the classifications 1410, the self-managed node 1260 generates a classification of the general resource usage tendencies of each task within a workload, as indicated in block 1544.

Further, in the illustrative embodiment, the self-managed node 1260 identifies the patterns in the resource utilization phases for each of the tasks of each of the assigned workloads, as indicated in block 1546. In doing so, the self-managed node 1260 may determine that a particular task experiences a phase of high processor utilization and low memory utilization that is typically followed by a phase of low processor utilization and high memory utilization, and that another task experiences similar phases, but at a different frequency or at a time offset from the other task. Additionally, as indicated in block 1548, the self-managed node 1260 may predict future resource utilization phases of the tasks within the workloads, such as by comparing a present resource utilization of each task to the identified patterns in the resource utilization phases to determine the present phase of each task, and then identifying the upcoming phases of the tasks from the patterns.

Additionally, in the illustrative embodiment, the self-managed node 1260 compares present and predicted resource utilization of the tasks of the workloads to the available resources to identify present and/or predicted resource contention, as indicated in block 1550. For example, in the illustrative embodiment, the self-managed node 1260 compares the present and predicted resource utilization of each task of each workload assigned to the self-managed node 1260 to a threshold amount (e.g., 100% of available capacity) to determine whether the corresponding resource is subject to resource contention or predicted to be subject to resource contention. As indicated in block 1552, the self-managed node 1260 also identifies any over allocation (i.e., underutilization) of resources available to the self-managed node 1260. For example, if the resource utilizations of the present phases or upcoming phases of the tasks of the workloads assigned to the self-managed node 1260, when summed together, do not satisfy a threshold capacity (e.g., 80%) of a particular type of resource (e.g., compute resource, accelerator resources, memory resources, or data storage resources), the self-managed node 1260, in the illustrative embodiment, identifies the corresponding resources as being underutilized.

In block 1554, the self-managed node 1260, in the illustrative embodiment, determines, as a function of the data analytics, an adjustment to the allocation of resources available to the self-managed node 1260. In doing so, the self-managed node 1260 may determine the adjustment using dedicated hardware (e.g., the orchestrator 1320) within the self-managed node 1260, as indicated in block 1556. Additionally, in determining the adjustment, the self-managed node 1260 may determine a reassignment of a task to another core of the CPU 1302, such as if the core is overloaded with instructions from other tasks, as indicated in block 1558. As indicated in block 1560, the self-managed node 1260 may determine a reallocation of memory and/or data storage to a task. Additionally or alternatively, the self-managed node 1260 may determine one or more execution time offsets to align the resource allocation phases of two or more tasks (e.g., a time offset to cause a low-processor intensive resource allocation phase of one task to occur contemporaneously with a high-processor intensive resource allocation phase of another task). Additionally or alternatively, the self-managed node 1260 may determine adjustments to settings of components available to the self-managed node 1260, as indicated in block 1564. For example, in determining the adjustment to the settings, the self-managed node 1260 may determine priority adjustments for the instruction ports 1324 of the CPU 1302, based on the priority objective data received in block 1512, or processor throttle adjustments, such as clock speed and/or processor affinity. Additionally or alternatively, the self-managed node 1260 may determine bus speeds, one or more fan speed adjustments, a change in the bandwidth of the communication circuitry 1308, or other adjustments to components within the self-managed node 1260. Subsequently, the method 1500 advances to block 1566 of FIG. 17 in which the self-managed node 1260 determines whether to apply the determined adjustments.

Figure 17:
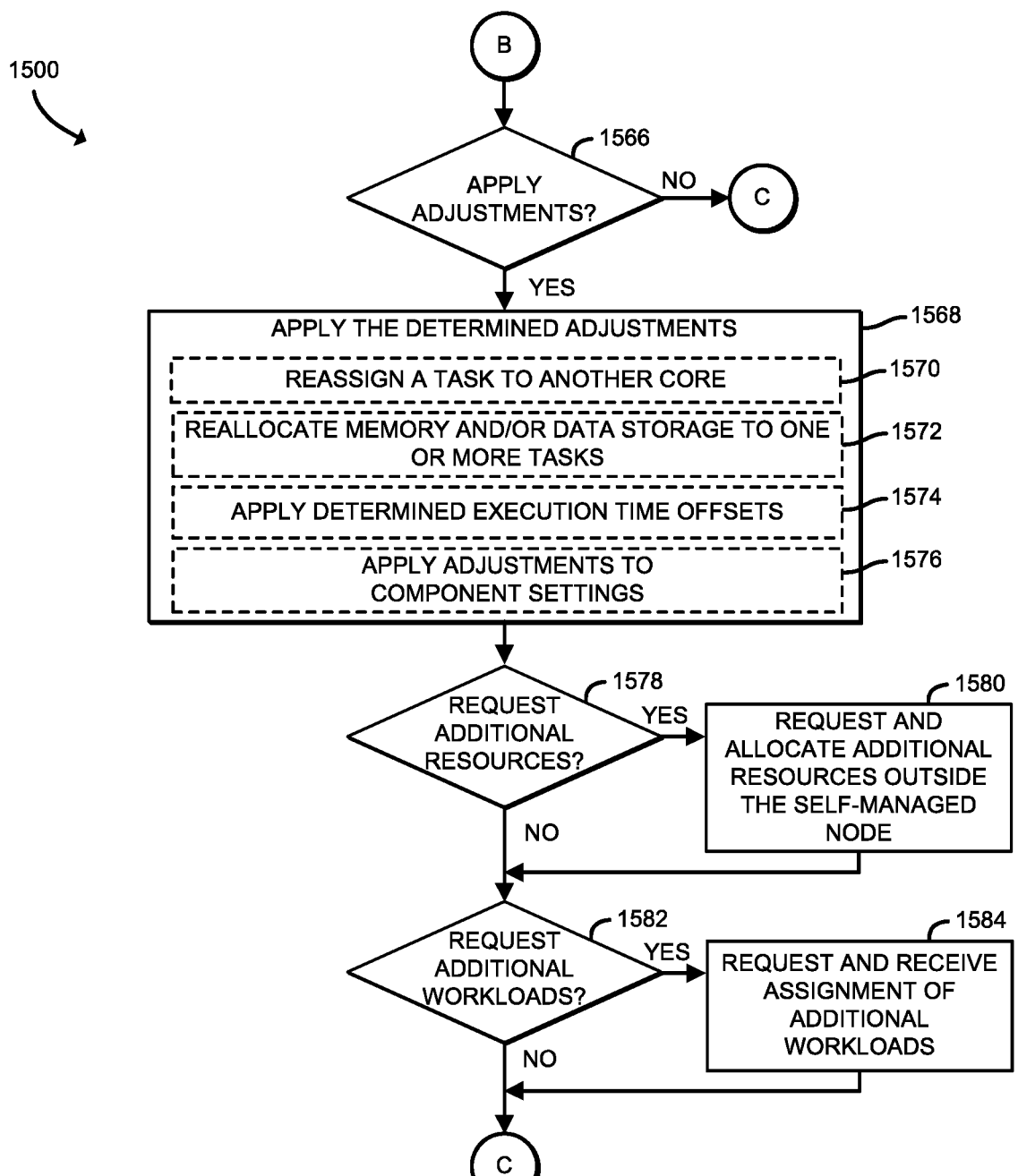

Referring now to FIG. 17, in determining whether to apply the determined adjustments, the self-managed node 1260 determines whether the determined adjustments will provide a Pareto improvement to the allocation of resources (e.g., an improvement to the achievement of the quality of service objectives without decreasing the achievement of any other resource allocation objectives). If no adjustments can be made to provide a Pareto improvement (e.g., the allocation of resources is already on the Pareto frontier), the method 1500 loops back to block 1520 of FIG. 15, in which the self-managed node 1260 continues to execute the assigned workloads. Otherwise, the method 1500 advances to block 1568 in which the self-managed node 1260 applies the determined adjustments. In applying the determined adjustments, the self-managed node 1260 may reassign a task to another core, as indicated in block 1570. Additionally or alternatively, the self-managed node 1260 may reallocate memory and/or data storage to one or more tasks, as indicated in block 1572. In the illustrative embodiment, in block 1574, the self-managed node 1260 may additionally or alternatively apply one or more execution time offsets to one or more tasks to align their resource utilization phases, as described above. Further, in the illustrative embodiment, the self-managed node 1260 may apply one or more determined adjustments to the settings of one or more components available to the self-managed node 1260, as indicated in block 1576 and as described above with reference to block 1564. In the illustrative embodiment, the self-managed node 1260 applies the determined adjustments using the dedicated hardware (e.g., the orchestrator 1320) in the self-managed node 1260. Subsequently, the method 1500 advances to block 1578 to determine whether to request additional resources (e.g., if the amount of resources available to the self-managed node 1260 is insufficient to meet the quality of service objectives). If the self-managed node 1260 determines to request additional resources, the method 1500 advances to block 1580 to request and allocate additional resource that are available outside of the self-managed node 1260 (e.g., physically located on another self-managed node 1260). Regardless, the method 1500 subsequently advances to block 1582, in which the self-managed node 1260 determines whether to request additional workloads (e.g., if the self-managed node 1260 has resource capacity to take on additional workloads without subjecting any resources to resource contention). If so, the method 1500 advances to block 1584, in which the self-managed node 1260 requests and receives an assignment of additional workloads from the distributor server 1240. Regardless, the method 1500 subsequently loops back to block 1520 of FIG. 15 to execute the tasks of the workloads assigned to the self-managed node 1260.

EXAMPLES

Illustrative examples of the technologies disclosed herein are provided below. An embodiment of the technologies may include any one or more, and any combination of, the examples described below.

Example 1 includes a self-managed node to dynamically allocate resources to workloads as the workloads are performed, the self-managed node comprising one or more processors; one or more memory devices having stored therein a plurality of instructions that, when executed by the one or more processors, cause the managed node to receive quality of service objective data indicative of a performance objective of one or more workloads assigned to the self-managed node, wherein each workload includes one or more tasks; execute the one or more tasks to perform the one or more workloads; obtain telemetry data as the workloads are performed, wherein the telemetry data is indicative of the utilization of resources available to the self-managed node; determine, as a function of the telemetry data, an adjustment to the allocation of the resources available to the self-managed node among the workloads to satisfy the performance objective; and apply the determined adjustment as the workloads are performed by the self-managed node.

Example 2 includes the subject matter of Example 1, and wherein the plurality of instructions, when executed, further cause the self-managed node to determine whether the self-managed node has sufficient resources to satisfy the performance objective; and request, in response to a determination that the self-managed node does not have sufficient resources to satisfy the performance objective, additional resources from at least one other self-managed node.

Example 3 includes the subject matter of any of Examples 1 and 2, and wherein the plurality of instructions, when executed, further cause the self-managed node to determine whether the self-managed node has satisfied the performance objective and has underutilized resources; and request, in response to a determination that the self-managed node has satisfied the performance objective and has underutilized resources, one or more additional workloads.

Example 4 includes the subject matter of any of Examples 1-3, and wherein to receive the quality of service objective data comprises to receive at least one of a latency objective indicative of a target time period in which to complete one or more of the tasks or a priority objective indicative of a priority of one or more workloads or instruction types for receiving resources.

Example 5 includes the subject matter of any of Examples 1-4, and wherein the plurality of instructions, when executed, cause the self-managed node to obtain the telemetry data, determine the adjustment, and apply the determined adjustment with a dedicated component of the one or more processors.

Example 6 includes the subject matter of any of Examples 1-5, and wherein to obtain the telemetry data comprises to obtain at least one of performance data indicative of a speed at which the workloads are executed, power consumption data indicative of an amount of power consumed by the self-managed node, temperature data indicative of a temperature within the self-managed node, processor utilization data indicative of an amount of processor usage consumed by each workload, memory utilization data indicative of an amount or frequency of memory use by each workload, or network utilization data indicative of an amount of network bandwidth used by each workload.

Example 7 includes the subject matter of any of Examples 1-6, and wherein to apply the determined adjustment comprises to reassign one or more of the tasks from one core to another core of the one or more processors.

Example 8 includes the subject matter of any of Examples 1-7, and wherein to apply the determined adjustment comprises to adjust an allocation of memory or data storage to one or more of the tasks.

Example 9 includes the subject matter of any of Examples 1-8, and wherein to apply the determined adjustment comprises to adjust one or more settings of the one or more processors.

Example 10 includes the subject matter of any of Examples 1-9, and wherein the plurality of instructions, when executed, further cause the self-managed node to generate data analytics from the telemetry data.

Example 11 includes the subject matter of any of Examples 1-10, and wherein to generate the data analytics comprises to determine a resource utilization pattern of one or more of the tasks.

Example 12 includes the subject matter of any of Examples 1-11, and wherein to generate the data analytics comprises to predict a future resource utilization of one or more of the tasks.

Example 13 includes the subject matter of any of Examples 1-12, and wherein to generate the data analytics comprises to determine whether one or more of the resources are presently subjected to resource contention.

Example 14 includes the subject matter of any of Examples 1-13, and wherein to generate the data analytics comprises to predict whether one or more of the resources will be subjected to resource contention.

Example 15 includes the subject matter of any of Examples 1-14, and wherein to determine the adjustment comprises to determine a time offset to align a resource utilization phase of one of the tasks with a resource utilization phase of another of the tasks.

Example 16 includes the subject matter of any of Examples 1-15, and wherein to determine the adjustment comprises to determine an adjustment to a priority associated with one or more instruction types to be processed by the one or more processors.

Example 17 includes the subject matter of any of Examples 1-16, and wherein the plurality of instructions, when executed, further cause the self-managed node to receive a plurality of resource allocation objectives to be satisfied; and wherein to determine an adjustment to the allocation of the resources comprises to determine an adjustment to increase an achievement of at least one of the resource allocation objectives without decreasing the achievement of any of the other resource allocation objectives.

Example 18 includes a method for dynamically allocating resources to workloads as the workloads are performed, the method comprising receiving, by a self-managed node, quality of service objective data indicative of a performance objective of one or more workloads assigned to the self-managed node, wherein each workload includes one or more tasks; executing, by the self-managed node, the one or more tasks to perform the one or more workloads; obtaining, by the self-managed node, telemetry data as the workloads are performed, wherein the telemetry data is indicative of the utilization of resources available to the self-managed node; determining, by the self-managed node and as a function of the telemetry data, an adjustment to the allocation of the resources available to the self-managed node among the workloads to satisfy the performance objective; and applying, by the self-managed node, the determined adjustment as the workloads are performed by the self-managed node.

Example 19 includes the subject matter of Example 18, and further including determining, by the self-managed node, whether the self-managed node has sufficient resources to satisfy the performance objective; and requesting, by the self-managed node and in response to a determination that the self-managed node does not have sufficient resources to satisfy the performance objective, additional resources from at least one other self-managed node.

Example 20 includes the subject matter of any of Examples 18 and 19, and further including determining, by the self-managed node, whether the self-managed node has satisfied the performance objective and has underutilized resources; and requesting, by the self-managed node in response to a determination that the self-managed node has satisfied the performance objective and has underutilized resources, one or more additional workloads.

Example 21 includes the subject matter of any of Examples 18-20, and wherein receiving the quality of service objective data comprises receiving at least one of a latency objective indicative of a target time period in which to complete one or more of the tasks or a priority objective indicative of a priority of one or more workloads or instruction types for receiving resources.

Example 22 includes the subject matter of any of Examples 18-21, and wherein obtaining the telemetry data, determining the adjustment, and applying the determined adjustment comprises obtaining the telemetry data, determining the adjustment, and applying the determined adjustment with a dedicated component of the self-managed node.

Example 23 includes the subject matter of any of Examples 18-22, and wherein obtaining the telemetry data comprises obtaining at least one of performance data indicative of a speed at which the workloads are executed, power consumption data indicative of an amount of power consumed by the self-managed node, temperature data indicative of a temperature within the self-managed node, processor utilization data indicative of an amount of processor usage consumed by each workload, memory utilization data indicative of an amount or frequency of memory use by each workload, or network utilization data indicative of an amount of network bandwidth used by each workload.

Example 24 includes the subject matter of any of Examples 18-23, and wherein applying the determined adjustment comprises reassigning one or more of the tasks from one core to another core of one or more processors of the self-managed node.

Example 25 includes the subject matter of any of Examples 18-24, and wherein applying the determined adjustment comprises adjusting an allocation of memory or data storage to one or more of the tasks.

Example 26 includes the subject matter of any of Examples 18-25, and wherein applying the determined adjustment comprises adjusting one or more settings of one or more processors of the self-managed node.

Example 27 includes the subject matter of any of Examples 18-26, and further including generating, by the self-managed node, data analytics from the telemetry data.

Example 28 includes the subject matter of any of Examples 18-27, and wherein generating the data analytics comprises determining a resource utilization pattern of one or more of the tasks.

Example 29 includes the subject matter of any of Examples 18-28, and wherein generating the data analytics comprises predicting a future resource utilization of one or more of the tasks.

Example 30 includes the subject matter of any of Examples 18-29, and wherein generating the data analytics comprises determining whether one or more of the resources are presently subjected to resource contention.

Example 31 includes the subject matter of any of Examples 18-30, and wherein generating the data analytics comprises predicting whether one or more of the resources will be subjected to resource contention.

Example 32 includes the subject matter of any of Examples 18-31, and wherein determining the adjustment comprises determining a time offset to align a resource utilization phase of one of the tasks with a resource utilization phase of another of the tasks.

Example 33 includes the subject matter of any of Examples 18-32, and wherein determining the adjustment comprises determining an adjustment to a priority associated with one or more instruction types to be processed by one or more processors of the self-managed node.

Example 34 includes the subject matter of any of Examples 18-33, and further including receiving, by the self-managed node, a plurality of resource allocation objectives to be satisfied; and wherein determining an adjustment to the allocation of the resources comprises determining an adjustment to increase an achievement of at least one of the resource allocation objectives without decreasing the achievement of any of the other resource allocation objectives.

Example 35 includes one or more machine-readable storage media comprising a plurality of instructions stored thereon that, in response to being executed, cause a self-managed node to perform the method of any of Examples 18-34.

Example 36 includes a self-managed node dynamically allocate resources to workloads as the workloads are performed, the self-managed node comprising one or more processors; one or more memory devices having stored therein a plurality of instructions that, when executed by the one or more processors, cause the self-managed node to perform the method of any of Examples 18-34.

Example 37 includes a self-managed node to dynamically allocate resources to workloads as the workloads are performed, the self-managed node comprising means for performing the method of any of Examples 18-34.

Example 38 includes a self-managed node to dynamically allocate resources to workloads as the workloads are performed, the self-managed node comprising network communicator circuitry to receive quality of service objective data indicative of a performance objective of one or more workloads assigned to the self-managed node, wherein each workload includes one or more tasks; workload executor circuitry to execute the one or more tasks to perform the one or more workloads and obtain telemetry data as the workloads are performed, wherein the telemetry data is indicative of the utilization of resources available to the self-managed node; resource manager circuitry to determine, as a function of the telemetry data, an adjustment to the allocation of the resources available to the self-managed node among the workloads to satisfy the performance objective and apply the determined adjustment as the workloads are performed by the self-managed node.

Example 39 includes the subject matter of Example 38, and wherein the resource manager circuitry is further to determine whether the self-managed node has sufficient resources to satisfy the performance objective; and request, in response to a determination that the self-managed node does not have sufficient resources to satisfy the performance objective, additional resources from at least one other self-managed node.

Example 40 includes the subject matter of any of Examples 38 and 39, and wherein the resource manager circuitry is further to determine whether the self-managed node has satisfied the performance objective and has underutilized resources; and request, in response to a determination that the self-managed node has satisfied the performance objective and has underutilized resources, one or more additional workloads.

Example 41 includes the subject matter of any of Examples 38-40, and wherein to receive the quality of service objective data comprises to receive at least one of a latency objective indicative of a target time period in which to complete one or more of the tasks or a priority objective indicative of a priority of one or more workloads or instruction types for receiving resources.

Example 42 includes the subject matter of any of Examples 38-41, and wherein to obtain the telemetry data comprises to obtain at least one of performance data indicative of a speed at which the workloads are executed, power consumption data indicative of an amount of power consumed by the self-managed node, temperature data indicative of a temperature within the self-managed node, processor utilization data indicative of an amount of processor usage consumed by each workload, memory utilization data indicative of an amount or frequency of memory use by each workload, or network utilization data indicative of an amount of network bandwidth used by each workload.

Example 43 includes the subject matter of any of Examples 38-42, and wherein to apply the determined adjustment comprises to reassign one or more of the tasks from one core to another core of the one or more processors.

Example 44 includes the subject matter of any of Examples 38-43, and wherein to apply the determined adjustment comprises to adjust an allocation of memory or data storage to one or more of the tasks.

Example 45 includes the subject matter of any of Examples 38-44, and wherein to apply the determined adjustment comprises to adjust one or more settings of the one or more processors.

Example 46 includes the subject matter of any of Examples 38-45, and wherein the resource manager circuitry is further to generate data analytics from the telemetry data.

Example 47 includes the subject matter of any of Examples 38-46, and wherein to generate the data analytics comprises to determine a resource utilization pattern of one or more of the tasks.

Example 48 includes the subject matter of any of Examples 38-47, and wherein to generate the data analytics comprises to predict a future resource utilization of one or more of the tasks.

Example 49 includes the subject matter of any of Examples 38-48, and wherein to generate the data analytics comprises to determine whether one or more of the resources are presently subjected to resource contention.

Example 50 includes the subject matter of any of Examples 38-49, and wherein to generate the data analytics comprises to predict whether one or more of the resources will be subjected to resource contention.

Example 51 includes the subject matter of any of Examples 38-50, and wherein to determine the adjustment comprises to determine a time offset to align a resource utilization phase of one of the tasks with a resource utilization phase of another of the tasks.

Example 52 includes the subject matter of any of Examples 38-51, and wherein to determine the adjustment comprises to determine an adjustment to a priority associated with one or more instruction types to be processed by the one or more processors.

Example 53 includes the subject matter of any of Examples 38-52, and wherein the network communicator circuitry is to receive a plurality of resource allocation objectives to be satisfied; and wherein to determine an adjustment to the allocation of the resources comprises to determine an adjustment to increase an achievement of at least one of the resource allocation objectives without decreasing the achievement of any of the other resource allocation objectives.

Example 54 includes a self-managed node for dynamically allocating resources to workloads as the workloads are performed, the self-managed node comprising circuitry for receiving quality of service objective data indicative of a performance objective of one or more workloads assigned to the self-managed node, wherein each workload includes one or more tasks; means for executing the one or more tasks to perform the one or more workloads; means for obtaining telemetry data as the workloads are performed, wherein the telemetry data is indicative of the utilization of resources available to the self-managed node; means for determining, as a function of the telemetry data, an adjustment to the allocation of the resources available to the self-managed node among the workloads to satisfy the performance objective; and means for applying the determined adjustment as the workloads are performed by the self-managed node.

Example 55 includes the subject matter of Example 54, and further including means for determining whether the self-managed node has sufficient resources to satisfy the performance objective; and means for requesting, in response to a determination that the self-managed node does not have sufficient resources to satisfy the performance objective, additional resources from at least one other self-managed node.

Example 56 includes the subject matter of any of Examples 54 and 55, and further including means for determining whether the self-managed node has satisfied the performance objective and has underutilized resources; and means for requesting, in response to a determination that the self-managed node has satisfied the performance objective and has underutilized resources, one or more additional workloads.

Example 57 includes the subject matter of any of Examples 54-56, and wherein the means for receiving the quality of service objective data comprises means for receiving at least one of a latency objective indicative of a target time period in which to complete one or more of the tasks or a priority objective indicative of a priority of one or more workloads or instruction types for receiving resources.

Example 58 includes the subject matter of any of Examples 54-57, and wherein the means for obtaining the telemetry data, the means for determining the adjustment, and the means for applying the determined adjustment comprises means for obtaining the telemetry data, means for determining the adjustment, and means for applying the determined adjustment with a dedicated component of the self-managed node.

Example 59 includes the subject matter of any of Examples 54-58, and wherein the means for obtaining the telemetry data comprises means for obtaining at least one of performance data indicative of a speed at which the workloads are executed, power consumption data indicative of an amount of power consumed by the self-managed node, temperature data indicative of a temperature within the self-managed node, processor utilization data indicative of an amount of processor usage consumed by each workload, memory utilization data indicative of an amount or frequency of memory use by each workload, or network utilization data indicative of an amount of network bandwidth used by each workload.

Example 60 includes the subject matter of any of Examples 54-59, and wherein the means for applying the determined adjustment comprises means for reassigning one or more of the tasks from one core to another core of one or more processors of the self-managed node.

Example 61 includes the subject matter of any of Examples 54-60, and wherein the means for applying the determined adjustment comprises means for adjusting an allocation of memory or data storage to one or more of the tasks.

Example 62 includes the subject matter of any of Examples 54-61, and wherein the means for applying the determined adjustment comprises means for adjusting one or more settings of one or more processors of the self-managed node.

Example 63 includes the subject matter of any of Examples 54-62, and further including means for generating data analytics from the telemetry data.

Example 64 includes the subject matter of any of Examples 54-63, and wherein the means for generating the data analytics comprises means for determining a resource utilization pattern of one or more of the tasks.

Example 65 includes the subject matter of any of Examples 54-64, and wherein the means for generating the data analytics comprises means for predicting a future resource utilization of one or more of the tasks.

Example 66 includes the subject matter of any of Examples 54-65, and wherein the means for generating the data analytics comprises means for determining whether one or more of the resources are presently subjected to resource contention.

Example 67 includes the subject matter of any of Examples 54-66, and wherein the means for generating the data analytics comprises means for predicting whether one or more of the resources will be subjected to resource contention.

Example 68 includes the subject matter of any of Examples 54-67, and wherein the means for determining the adjustment comprises means for determining a time offset to align a resource utilization phase of one of the tasks with a resource utilization phase of another of the tasks.

Example 69 includes the subject matter of any of Examples 54-68, and wherein the means for determining the adjustment comprises means for determining an adjustment to a priority associated with one or more instruction types to be processed by one or more processors of the self-managed node.

Example 70 includes the subject matter of any of Examples 54-69, and further including circuitry for receiving, by the self-managed node, a plurality of resource allocation objectives to be satisfied; and wherein the means for determining an adjustment to the allocation of the resources available to the self-managed node comprises means for determining an adjustment to increase an achievement of at least one of the resource allocation objectives without decreasing the achievement of any of the other resource allocation objectives.

The invention claimed is:
1. A self-managed node to dynamically allocate resources to workloads as the workloads are performed, the self-managed node comprising:
one or more processors;
one or more memory devices having stored therein a plurality of instructions that, when executed by the one or more processors, cause the managed node to:
receive quality of service objective data indicative of a performance objective of one or more workloads assigned to the self-managed node, wherein each workload includes one or more tasks;

execute the one or more tasks to perform the one or more workloads;

obtain telemetry data as the workloads are performed, wherein the telemetry data is indicative of the utilization of resources available to the self-managed node;

determine, as a function of the telemetry data, an adjustment to the allocation of the resources available to the self-managed node among the workloads to satisfy the performance objective; and apply the determined adjustment as the workloads are performed by the self-managed node.

2. The self-managed node of claim 1, wherein the plurality of instructions, when executed, further cause the self-managed node to:

determine whether the self-managed node has sufficient resources to satisfy the performance objective; and request, in response to a determination that the self-managed node does not have sufficient resources to satisfy the performance objective, additional resources from at least one other self-managed node.

3. The self-managed node of claim 1, wherein the plurality of instructions, when executed, further cause the self-managed node to:

determine whether the self-managed node has satisfied the performance objective and has underutilized resources; and request, in response to a determination that the self-managed node has satisfied the performance objective and has underutilized resources, one or more additional workloads.

4. The self-managed node of claim 1, wherein to receive the quality of service objective data comprises to receive at least one of a latency objective indicative of a target time period in which to complete one or more of the tasks or a priority objective indicative of a priority of one or more workloads or instruction types for receiving resources.

5. The self-managed node of claim 1, wherein the plurality of instructions, when executed, cause the self-managed node to obtain the telemetry data, determine the adjustment, and apply the determined adjustment with a dedicated component of the one or more processors.

6. The self-managed node of claim 1, wherein to obtain the telemetry data comprises to obtain at least one of performance data indicative of a speed at which the workloads are executed, power consumption data indicative of an amount of power consumed by the self-managed node, temperature data indicative of a temperature within the self-managed node, processor utilization data indicative of an amount of processor usage consumed by each workload, memory utilization data indicative of an amount or frequency of memory use by each workload, or network utilization data indicative of an amount of network bandwidth used by each workload.

7. The self-managed node of claim 1, wherein to apply the determined adjustment comprises to reassign one or more of the tasks from one core to another core of the one or more processors.

8. The self-managed node of claim 1, wherein to apply the determined adjustment comprises to adjust an allocation of memory or data storage to one or more of the tasks.

9. The self-managed node of claim 1, wherein to apply the determined adjustment comprises to adjust one or more settings of the one or more processors.

10. The self-managed node of claim 1, wherein the plurality of instructions, when executed, further cause the self-managed node to generate data analytics from the telemetry data.

11. The self-managed node of claim 10, wherein to generate the data analytics comprises to determine a resource utilization pattern of one or more of the tasks.

12. The self-managed node of claim 10, wherein to generate the data analytics comprises to predict a future resource utilization of one or more of the tasks.

13. One or more machine-readable storage media comprising a plurality of instructions stored thereon that, in response to being executed, cause a self-managed node to:

receive quality of service objective data indicative of a performance objective of one or more workloads assigned to the self-managed node, wherein each workload includes one or more tasks;

execute the one or more tasks to perform the one or more workloads;

obtain telemetry data as the workloads are performed, wherein the telemetry data is indicative of the utilization of resources available to the self-managed node;

determine, as a function of the telemetry data, an adjustment to the allocation of the resources available to the self-managed node among the workloads to satisfy the performance objective; and apply the determined adjustment as the workloads are performed by the self-managed node.

14. The one or more machine-readable storage media of claim 13, wherein the plurality of instructions, when executed, further cause the self-managed node to:

determine whether the self-managed node has sufficient resources to satisfy the performance objective; and request, in response to a determination that the self-managed node does not have sufficient resources to satisfy the performance objective, additional resources from at least one other self-managed node.

15. The one or more machine-readable storage media of claim 13, wherein the plurality of instructions, when executed, further cause the self-managed node to:

determine whether the self-managed node has satisfied the performance objective and has underutilized resources; and request, in response to a determination that the self-managed node has satisfied the performance objective and has underutilized resources, one or more additional workloads.

16. The one or more machine-readable storage media of claim 13, wherein to receive the quality of service objective data comprises to receive at least one of a latency objective indicative of a target time period in which to complete one or more of the tasks or a priority objective indicative of a priority of one or more workloads or instruction types for receiving resources.

17. The one or more machine-readable storage media of claim 13, wherein the plurality of instructions, when executed, cause the self-managed node to obtain the telemetry data, determine the adjustment, and apply the determined adjustment with a dedicated component of the one or more processors.

18. The one or more machine-readable storage media of claim 13, wherein to obtain the telemetry data comprises to obtain at least one of performance data indicative of a speed at which the workloads are executed, power consumption data indicative of an amount of power consumed by the self-managed node, temperature data indicative of a temperature within the self-managed node, processor utilization data indicative of an amount of processor usage consumed by each workload, memory utilization data indicative of an amount or frequency of memory use by each workload, or network utilization data indicative of an amount of network bandwidth used by each workload.

19. The one or more machine-readable storage media of claim 13, wherein to apply the determined adjustment comprises to reassign one or more of the tasks from one core to another core of the one or more processors.

20. The one or more machine-readable storage media of claim 13, wherein to apply the determined adjustment comprises to adjust an allocation of memory or data storage to one or more of the tasks.

21. The one or more machine-readable storage media of claim 13, wherein to apply the determined adjustment comprises to adjust one or more settings of the one or more processors.

22. The one or more machine-readable storage media of claim 13, wherein the plurality of instructions, when executed, further cause the self-managed node to generate data analytics from the telemetry data.

23. The one or more machine-readable storage media of claim 22, wherein to generate the data analytics comprises to determine a resource utilization pattern of one or more of the tasks.

24. The one or more machine-readable storage media of claim 22, wherein to generate the data analytics comprises to predict a future resource utilization of one or more of the tasks.

25. A self-managed node for dynamically allocating resources to workloads as the workloads are performed, the self-managed node comprising:
   circuitry for receiving quality of service objective data indicative of a performance objective of one or more workloads assigned to the self-managed node, wherein each workload includes one or more tasks;
   means for executing the one or more tasks to perform the one or more workloads;
   means for obtaining telemetry data as the workloads are performed, wherein the telemetry data is indicative of the utilization of resources available to the self-managed node;
   means for determining, as a function of the telemetry data, an adjustment to the allocation of the resources available to the self-managed node among the workloads to satisfy the performance objective; and
   means for applying the determined adjustment as the workloads are performed by the self-managed node.

26. A method for dynamically allocating resources to workloads as the workloads are performed, the method comprising:
   receiving, by a self-managed node, quality of service objective data indicative of a performance objective of one or more workloads assigned to the self-managed node, wherein each workload includes one or more tasks;
   executing, by the self-managed node, the one or more tasks to perform the one or more workloads;
   obtaining, by the self-managed node, telemetry data as the workloads are performed, wherein the telemetry data is indicative of the utilization of resources available to the self-managed node;
   determining, by the self-managed node and as a function of the telemetry data, an adjustment to the allocation of the resources available to the self-managed node among the workloads to satisfy the performance objective; and
   applying, by the self-managed node, the determined adjustment as the workloads are performed by the self-managed node.

27. The method of claim 26, further comprising:
   determining, by the self-managed node, whether the self-managed node has sufficient resources to satisfy the performance objective; and
   requesting, by the self-managed node and in response to a determination that the self-managed node does not have sufficient resources to satisfy the performance objective, additional resources from at least one other self-managed node.

28. The method of claim 26, further comprising:
   determining, by the self-managed node, whether the self-managed node has satisfied the performance objective and has underutilized resources; and
   requesting, by the self-managed node in response to a determination that the self-managed node has satisfied the performance objective and has underutilized resources, one or more additional workloads.

29. The method of claim 26, wherein receiving the quality of service objective data comprises receiving at least one of a latency objective indicative of a target time period in which to complete one or more of the tasks or a priority objective indicative of a priority of one or more workloads or instruction types for receiving resources.

30. The method of claim 26, wherein obtaining the telemetry data, determining the adjustment, and applying the determined adjustment comprises obtaining the telemetry data, determining the adjustment, and applying the determined adjustment with a dedicated component of the self-managed node.

* * * * *